United States Patent [19]

Nett, Jr. et al.

[11] Patent Number: 4,971,547

[45] Date of Patent: Nov. 20, 1990

[54] APPARATUS FOR DISTRIBUTING A FLUID SUBSTANCE

[75] Inventors: John A. Nett, Jr., Milwaukee; Walter C. Schmitt, Jr., Glendale; Walter Lutz, Jr.; James A. Capadona, both of Cedarburg, all of Wis.

[73] Assignee: Signicast Corporation, Milwaukee, Wis.

[21] Appl. No.: 198,458

[22] Filed: May 25, 1988

[51] Int. Cl.$^5$ ............................................ B29C 45/03
[52] U.S. Cl. .................................... 425/135; 425/143; 425/547; 425/560
[58] Field of Search ............... 425/200, 542, 547, 559, 425/583, 548, 557, 558, 560, 561, 562, 145, 149, 135

[56] References Cited

U.S. PATENT DOCUMENTS

| | | | |
|---|---|---|---|
| 217,965 | 7/1879 | Waring | 417/254 |
| 905,108 | 11/1908 | Scott | 417/509 |
| 2,434,557 | 1/1948 | Fox, Jr. et al. | 425/146 |
| 2,439,506 | 4/1948 | Christian | 425/178 |
| 2,460,831 | 2/1949 | Kovacs | 264/328.4 |
| 2,478,013 | 1/1949 | Roddy | 264/328.6 |
| 2,742,197 | 4/1956 | Walsh | 222/249 |
| 2,881,477 | 4/1959 | Triulzi | 425/145 |
| 3,141,915 | 7/1964 | Nieuwenhuis et al. | 264/330 |
| 3,162,703 | 12/1964 | Eyles | 425/547 |
| 3,353,209 | 11/1967 | Schad | 264/328.4 |
| 3,406,741 | 10/1968 | Leach | 165/1 |
| 3,680,995 | 8/1972 | Frazier et al. | 425/200 |
| 3,788,522 | 1/1974 | Mercer | 222/146 |
| 3,822,057 | 7/1974 | Wheeler | 425/145 |
| 3,888,388 | 6/1975 | Mahoney | 425/145 |
| 3,932,083 | 1/1976 | Boettner | 425/145 |
| 4,274,823 | 6/1981 | Stanciu et al. | 425/145 |
| 4,557,683 | 12/1985 | Meeker et al. | 425/557 |
| 4,579,515 | 4/1986 | Kawaguchi et al. | 425/145 |
| 4,632,652 | 12/1986 | Farrell | 425/149 |
| 4,661,321 | 4/1987 | Byrd et al. | 422/111 |
| 4,678,420 | 7/1987 | Inoue | 425/149 |
| 4,722,679 | 2/1988 | Farrell | 425/149 |
| 4,752,201 | 6/1988 | Kauffman et al. | 425/145 |

FOREIGN PATENT DOCUMENTS 3607354 10/1987 Fed. Rep. of Germany .
1181018 6/1959 France .................. 425/547

*Primary Examiner*—Willard Hoag
*Attorney, Agent, or Firm*—Foley & Lardner

[57] ABSTRACT

A system for distributing wax or a similar substance in semi-solid form is provided which includes a liquid wax supply system, a wax conditioning system including a heat exchanger which cools the wax to a semi-solid state and an accumulator for storing conditioned wax until needed, and a die press or similar work station which receives semi-solid wax from the accumulator in a continuous stream or flow. Such a system allows a lost wax die press to operate without need to manually open and reload the press with wax. An automated control system according to the invention allows die press reloading to occur automatically when needed, and operates the wax conditioning system as needed to maintain a supply of wax in the accumulator. Wax tunneling problems are avoided by means of a piston disposed in the heat exchanger which is movably interposed between hot liquid wax entering the heat exchanger and cooler, semi-solid wax leaving the heat exchanger.

29 Claims, 11 Drawing Sheets

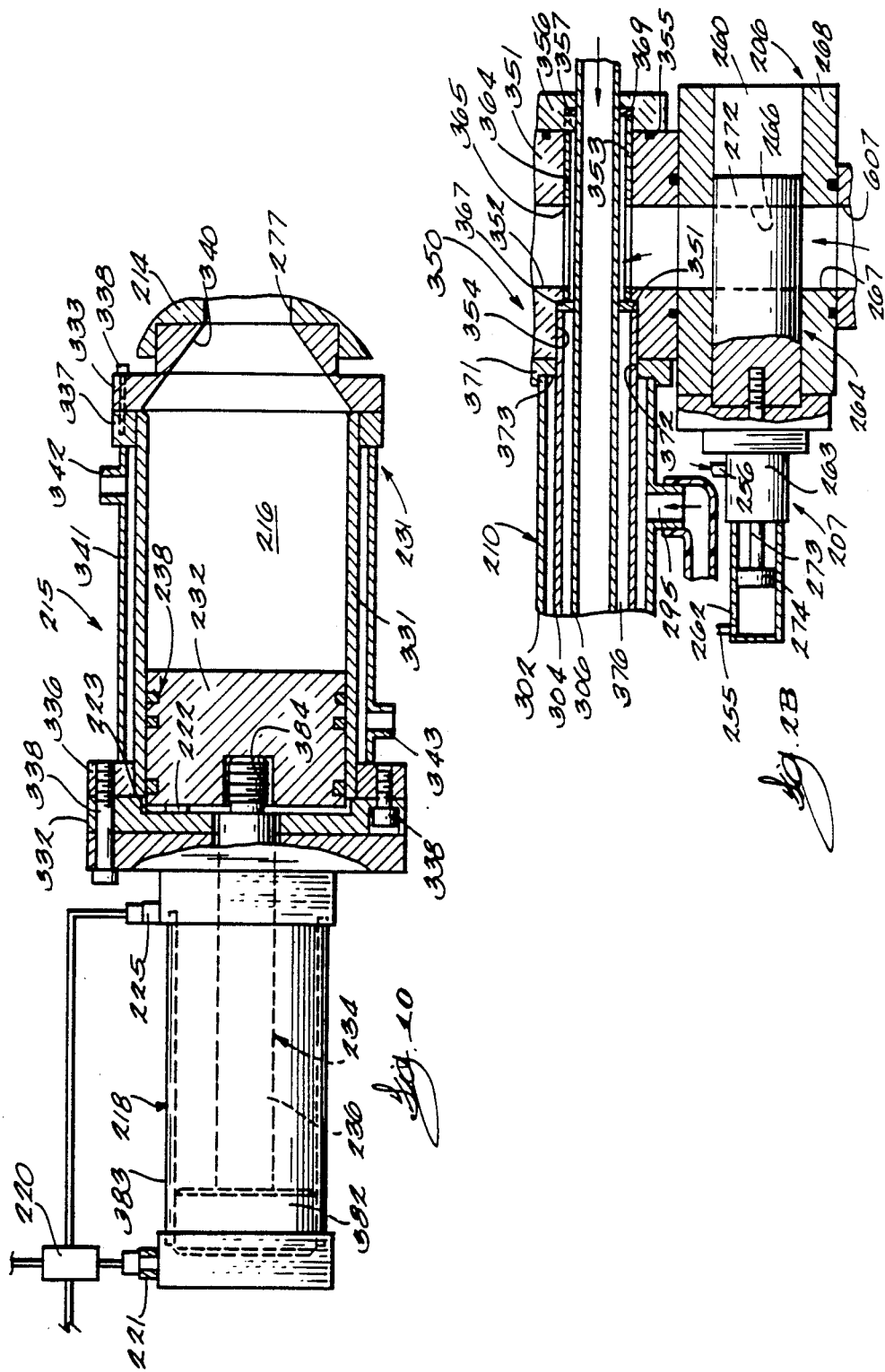

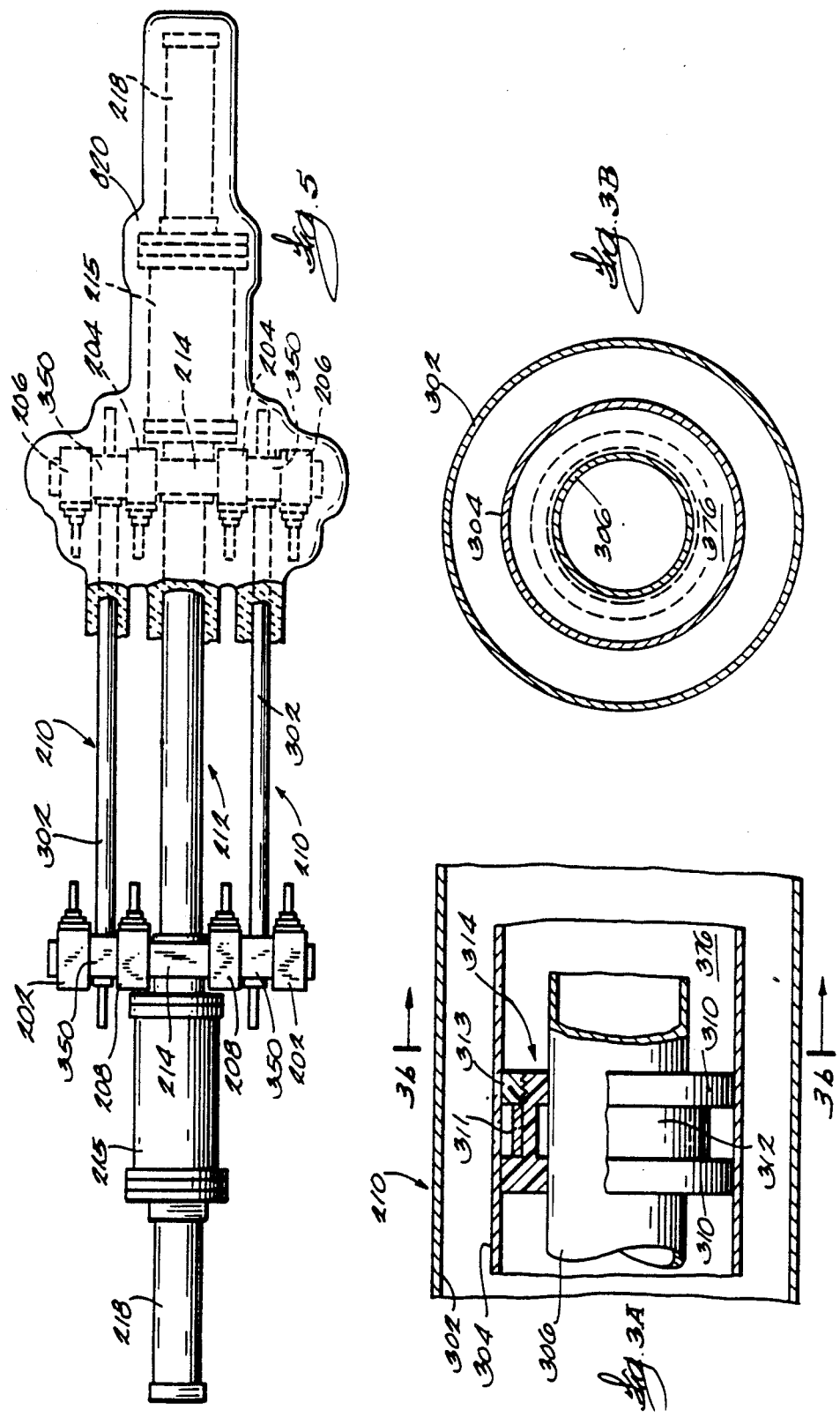

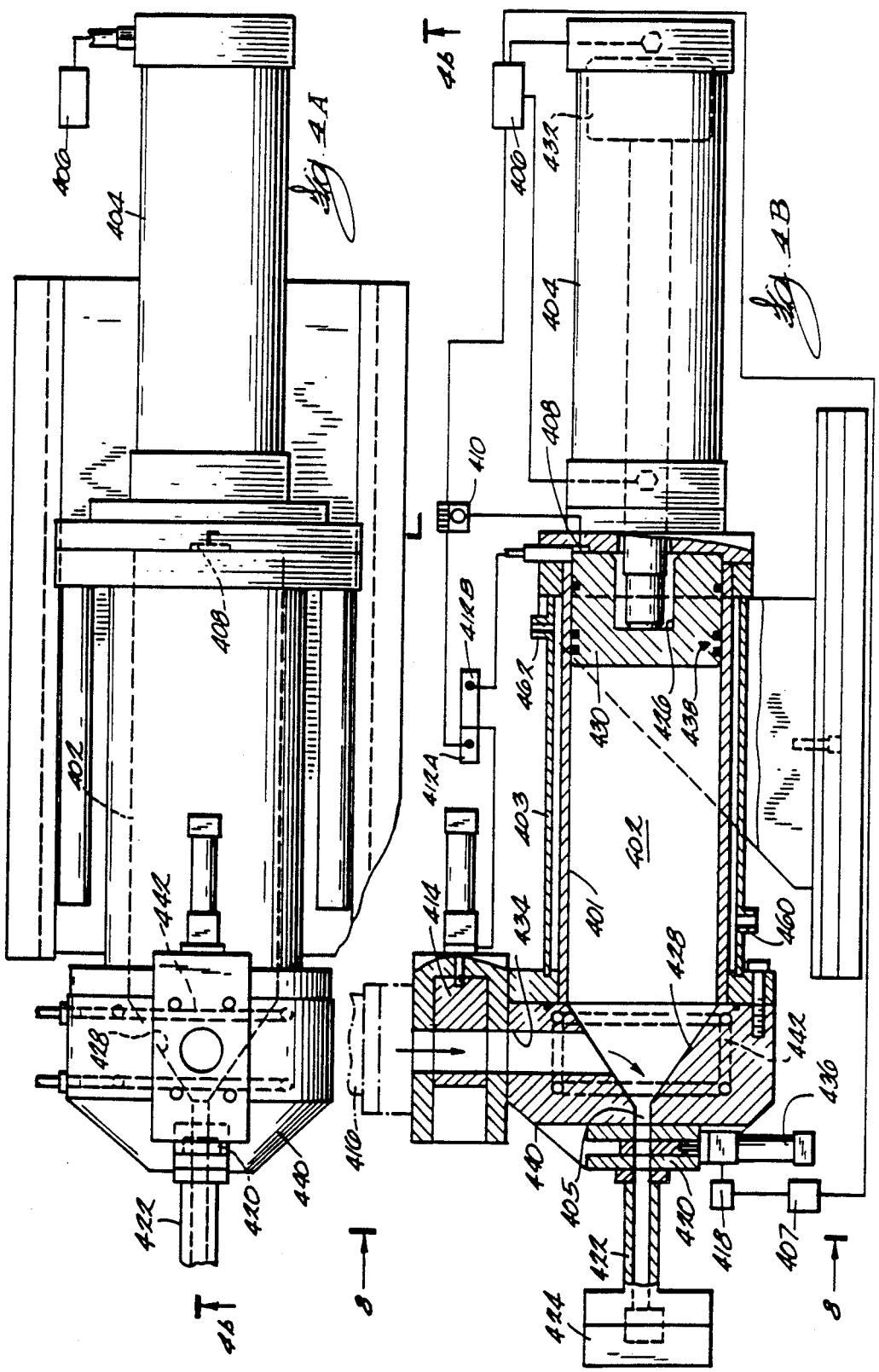

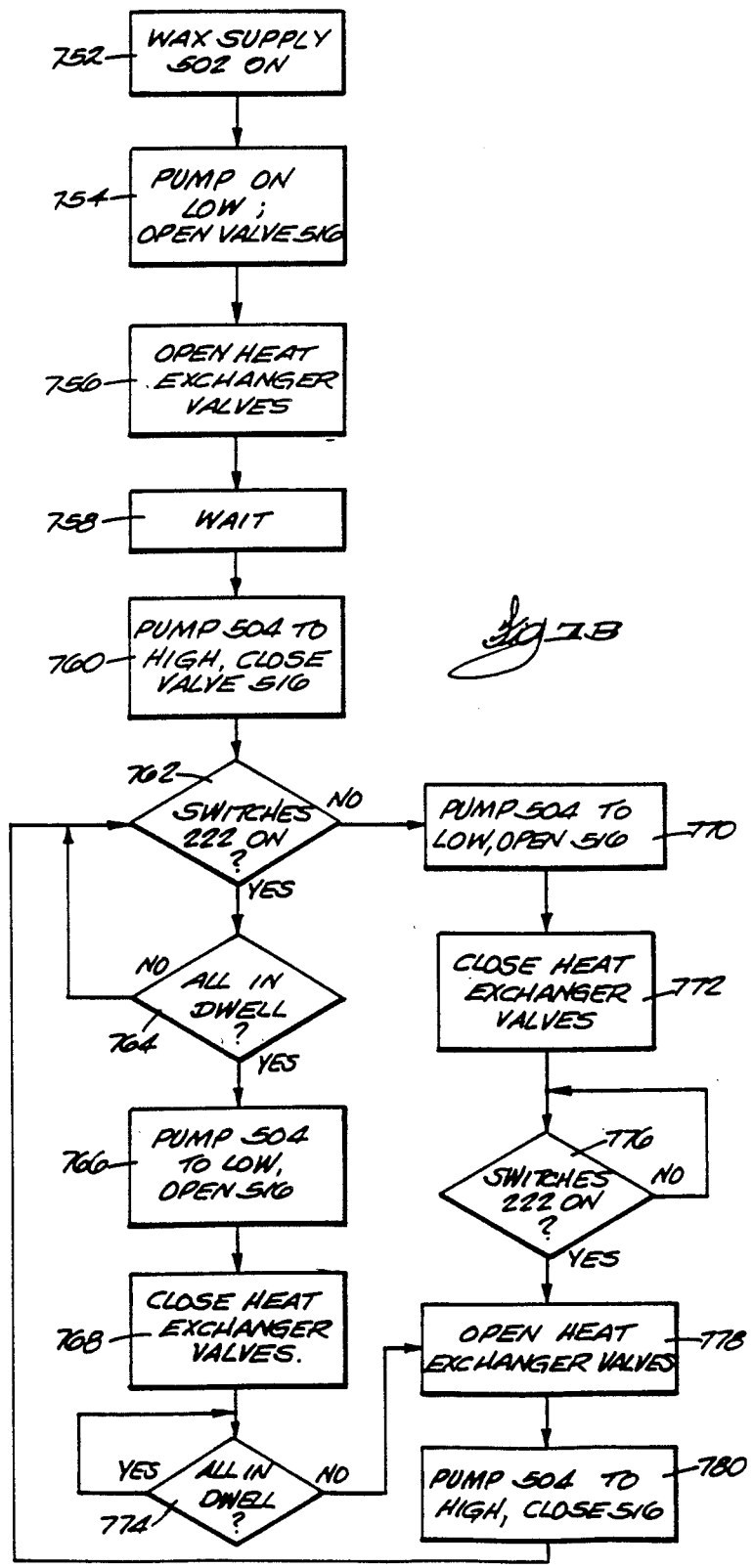

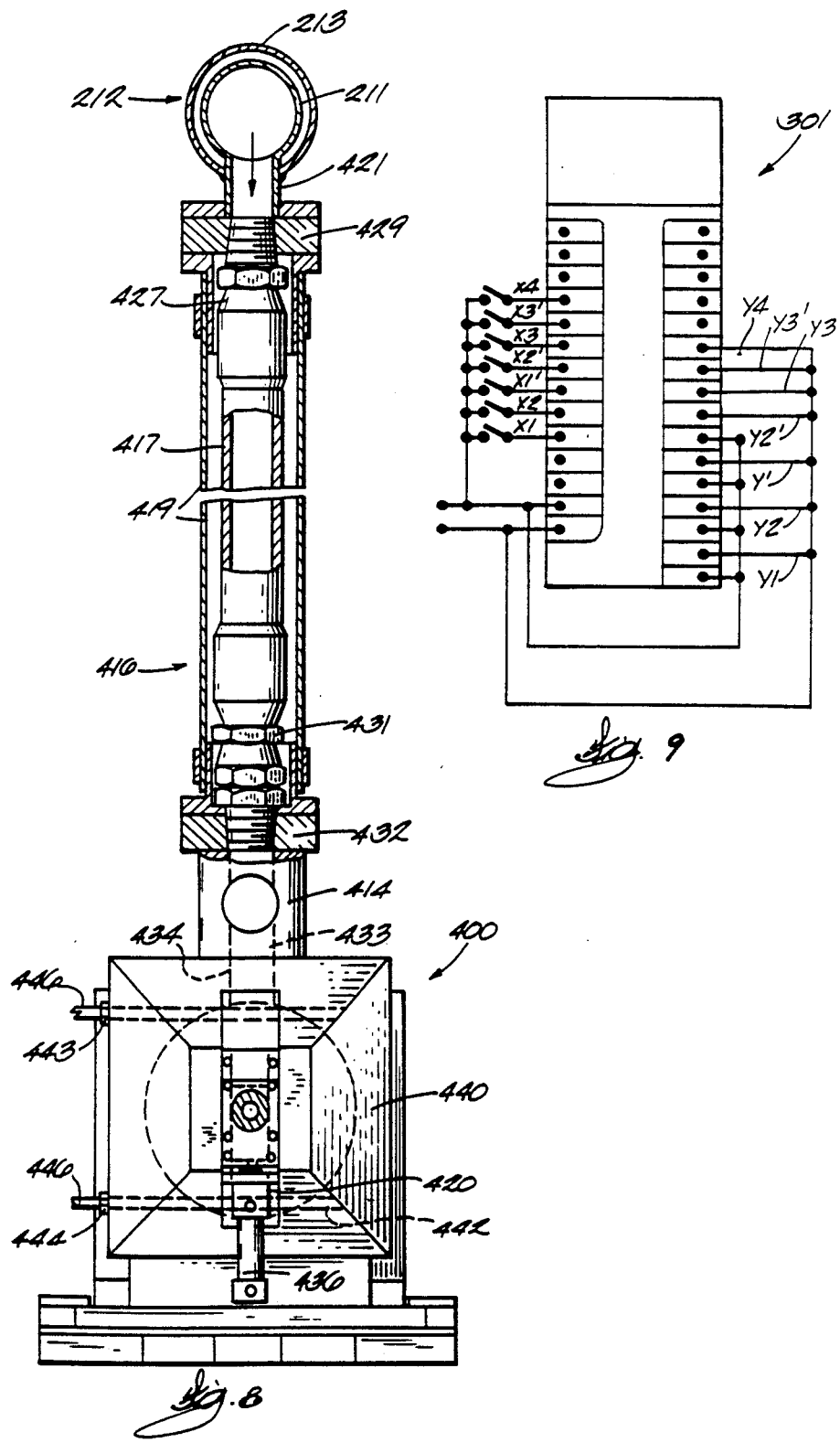

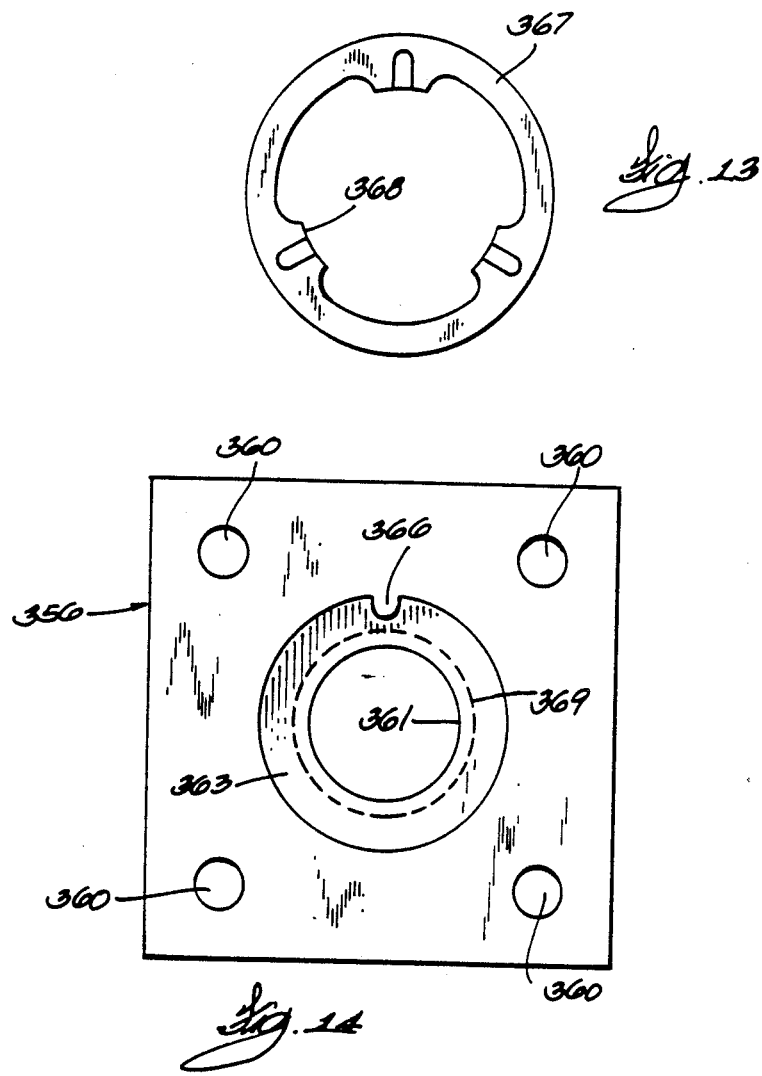

APPARATUS FOR DISTRIBUTING A FLUID SUBSTANCE

TECHNICAL FIELD

This invention relates generally to a system for distributing a fluid substance such as wax to one or more work stations, and specifically to a system for providing a continuous supply of semi-solid wax at a narrowly controlled predetermined temperature to one or more wax injection presses used in investment casting.

BACKGROUND OF THE INVENTION

Investment casting, and more particularly, "lost wax" casting, is an industrial process used in the production of cast parts which involves: injecting wax into a metal die to produce a wax pattern; removing the wax pattern from the die; coating the pattern with a ceramic shell; heating the shell to melt, and thereby remove, the wax; and subsequently filling the ceramic shell with molten metal.

The investment casting process begins with the production of a one-piece, heat-disposable pattern. Patterns are usually made by injecting wax, foam, or plastic into a metal die. Upon cooling, the die is opened and the wax pattern is removed. The process is repeated until the desired number of wax patterns is produced.

Each pattern includes one or more gates, preferably located at the heaviest (thickest) portion of the pattern. Gates are generally flat wax projections which attach the pattern to a sprue. A sprue is a wax connector used to fasten patterns together to form a cluster. Sprues vary in size and shape and can accommodate from one up to several hundred patterns, depending on pattern size and shape. A flat soldering blade is placed between the gate of a pattern and the face of a sprue to heat seal the mating surfaces together. A pouring cup is secured to the central sprue of the cluster.

The cluster is dipped ("invested") in a ceramic slurry. Excess slurry is drained off and the cluster is coated with a fine ceramic sand and dried. The coating process is repeated, using progressively coarser grades of ceramic material, until a self-supporting shell is formed encapsulating the cluster.

The coated cluster is placed in a furnace or steam autoclave where the wax, including patterns, gates, and runners, melt and flow out of the mold through the pouring cup. The result is a ceramic mold corresponding to the shape of the cluster, each separate mold in the cluster having 3/16" to ⅜" thick walls and precisely shaped cavities corresponding to the desired configuration of a finished part. The ceramic mold is then fired to burn out the last traces of wax and to preheat the mold in preparation for the casting operation. The hot mold is taken from the furnace and molten metal is immediately poured into it.

After the metal-filled mold has cooled, the ceramic mold material is removed from the casting cluster by any suitable method, e.g., mechanical vibration or chemical cleaning. Individual castings are then severed from the cluster, for example, by cut-off wheels, and any remaining protrusions left by gates or runners are removed, for example, by belt grinding. The casting is then ready for secondary operations, including heat treating, straightening, machining, and whatever inspection may be required.

An important advantage of investment casting vis-a-vis other manufacturing processes is the high volume production which may be achieved from a single metal die through the use of wax patterns. For very large parts, a cluster may carry a single pattern. For smaller parts, a cluster may comprise several hundred individual patterns.

Another advantage of investment casting is the degree of complexity which can be imparted to the finished parts. Finished parts exhibit fine, precise detail without complex machining operations normally associated therewith. In order to achieve this detail, however, it is important that the wax completely fill all voids in the metal die. Shrinkage of the wax patterns during cooling must also be minimized. Presently known methods of wax injection are not completely satisfactory in these respects.

Three principal techniques are commonly employed to inject wax into the metal die: semi-solid billet injection, paste injection, or liquid injection. The most common method is liquid injection.

Semi-solid injection begins with a cylindrical billet of wax, typically approximately seven inches in diameter and weighing approximately twenty-two pounds. The billet is softened to decrease the viscosity of the wax and thereby facilitate more complete penetration of wax into a die. Billets are typically softened by immersion in warm air or water for approximately 48 hours to achieve a uniform temperature. The softened billet is then placed in a shot chamber associated with a billet extrusion press. A shot chamber piston forces the semi-solid wax through an injection valve and into the metal die.

To facilitate loading, each billet occupies slightly less volume than its shot chamber. Moreover, each time a new billet is loaded into a shot chamber, small pockets of air are trapped between the irregular surfaces of successive billets, between the billet and the walls of the shot chamber, and between the billet and the shot piston. These conditions result in the introduction of air into the die. Trapped air causes air bubble surface or subsurface defects on the resulting wax pattern. Bleed holes are sometimes placed at carefully selected locations in the die so that unwanted air may blow through the die, but this technique is not completely effective because wax often plugs up the bleed holes, leaving internal pockets or holes within the pattern.

Moreover, billet wax injection results in considerable inefficiencies because of the fixed billet size. For example, if a particular die requires more than eleven pounds of wax for an injection, only one injection can be used per twenty-two pound billet. After injecting a die with wax from a first billet, the unused portion of that billet, which is insufficient to fill the die again, must be removed from the shot chamber. After a new billet is inserted, the wax which remained in the shot chamber must be purged to eliminate pockets of air at the old billet/new billet interface. Although the purged and discarded wax may be recycled, the associated time and labor costs are considerable.

The second commonly used wax injection method involves heating wax to soften it into a paste before injecting it into a die. Paste injection eliminates air pockets, and the need to purge unused wax, because: (1) there are no interfaces between successive fillings; and (2) the paste completely fills the shot chamber. A major disadvantage associate with this technique, however, is the tremendous handling problem posed by paste wax. Typically, paste injection requires an operator to manually scoop the paste into a shot chamber as needed. This results in increased time and labor per piece part. Transporting paste, maintaining its temperature, and depositing it into press shot chambers are cumbersome and inefficient procedures.

The third commonly used method involves heating the wax to a liquid state and thereafter injecting it into a metal die. The elevated temperature of liquid wax exacerbates shrinkage. Wax shrinks as a function of change in temperature. The higher the injection temperature of the wax, the more it shrinks as it cools to room temperature. Thus, for a given volume, paste wax shrinks more than semi-solid wax, and liquid wax shrinks more than paste wax as the wax cools to room temperature. As the wax shrinks, it pulls away from the mold surface. To achieve optimum dimensional integrity of the finished parts, such shrinkage must be minimized. Furthermore, maintenance of consistent, repeatable piece-part tolerances requires minimizing variations in change in temperature, since such variations will cause corresponding variations in shrinkage. Consequently, it is desirable to inject wax into the die at the lowest possible temperature while allowing the wax to completely fill all voids in the die while minimizing variations in the injection temperature in the course of successive injections.

The degree of precision with which the injection temperature of the wax is maintained is important in achieving optimal dimensional integrity of the finished parts. This is particularly true with respect to large parts because the amount of shrinkage is generally proportional to the size of the part.

Various systems have been proposed for controlling the temperature of a fluid (liquid or semi-solid) substance. For example, maintaining the temperature of a substance within a vessel by enveloping the vessel in a water jacket is generally known. See, e.g., Mercer U.S. Pat. No. 3,788,522 issued Jan. 29, 1974; and Byrd U.S. Pat. No. 4,661,321 issued Apr. 28, 1987. However, reducing the temperature of heated wax with such a conventional heat exchanger poses insurmountable problems because the viscosity of wax increases rapidly as its temperature is reduced. Consequently, higher temperature (lower viscosity) wax tends to "tunnel" through lower temperature (higher viscosity) wax when the former is used to urge the latter through a heat exchanger. Tunneling occurs when wax at a higher temperature is forced against wax at a lower temperature in order to drive the lower temperature wax through a heat exchanger. Typically, the higher temperature wax, being less viscous than the lower temperature wax, creates small irregular paths through the lower temperature wax. The lower temperature wax remains essentially stationary as the higher temperature wax tunnels through it. Furthermore, the low coefficient of thermal conductivity of wax requires long residence times thermal conventional heat exchangers, which translates to increased piece part production costs.

Heat exchangers and pistons are generally known and have been used to propel liquids. See, for example, Scott U.S. Pat. No. 905,108 issued Nov. 24, 1908; Walsh U.S. Pat. No. 2,742,197 issued Apr. 17, 1956; Waring U.S. Pat. No. 217,965 issued July 29, 1879, and Byrd U.S. Pat. No. 4,661,321 issued Apr. 28, 1987. However, such mechanical components have not been advantageously utilized in wax distribution systems.

An improved system for distributing wax to a series of injection presses is described in Christian U.S. Pat. No. 2,439,506 issued May 28, 1945. This patent discloses a system for distributing wax or other molding material, adapted to simultaneously supply a series of molding machines with the material in a proper condition for molding. Wax is pumped from a container and propelled through a conduit to a series of injection presses. In the conduit network, the temperature of the wax is maintained at a point where it is sufficiently plastic to flow. When the wax is injected into the mold, its temperature is preferably somewhat lower than its temperature while passing through the pump. This maintains the wax sufficiently viscous when entering the mold to avoid danger of mixing with the air in the mold cavity.

This system exemplifies some of the inherent problems associated with using wax as a pattern material. For example, it is desirable that wax completely fill the mold cavity in a condition free of holes. Furthermore, wax may be pumped only when it is in a liquid state. However, injecting wax into a mold in a liquid state necessarily requires using wax at a wax injection temperature which results in a high degree of shrinkage upon cooling.

Other attempts to deal with the shrinkage problem have been made. In the previously discussed paste injection method, wax has been cooled to a paste and scooped into a shot chamber associated with an injection press. This method, however, involves extensive labor costs and increases production time.

To the extent residence times can be minimized through the use of an innovative heat exchanger, the tunneling problem, which is inherent when a head of liquid wax is forced against a head of semi-solid wax, prevents high volume, continuous distribution of semi-solid wax. The present invention provides a wax distribution system which deals successfully with these problems.

SUMMARY OF THE INVENTION

According to the present invention, a distribution system usefull in investment casting can distribute a fluid substance such as wax in the form of a continuous stream at an accurately controlled, predetermined temperature to at least one work station, such as a wax injection press machine having a die associated therewith. According to one aspect of the invention, such a system includes a supply system which provides the substance in liquid form, a heat exchanger which receives the liquid substance and cools it to a semi-solid state, optionally an accumulator for storing the semi-solid substance until needed, and suitable mechanisms for selectively feeding the semi-solid substance in a continuous steam to the work station.

According to another aspect of the invention, a heat exchanger, having a sliding piston-like member disposed therein, cools liquid wax from a relatively higher temperature to a desired injection temperature and discharges the cooled wax into an accumulator, where the wax is stored until it is forced into the work station. The heat exchanger has a thin heat exchange chamber defined between a pair of shells which minimizes the residence time required to reduce the temperature of the wax by maximizing the shell surface area in contact with a heat exchange medium for a given volume of wax. The piston disposed within the heat exchange chamber forms a physical barrier between the higher and lower temperature wax and thus prevents tunneling as liquid wax urges semi-solid wax out of the heat exchanger into the accumulator.

The invention further provides a process for distributing a semi-solid substance using, for example, the system according to the invention, together with a series of subsystems which have utility both in the distributing system according to the invention and in other fields. Such subsystems include, for example, a heat exchanger assembly utilizing a free reciprocating piston, an accumulator which combines a press unit, an intake manifold, and a reservoir for a fluid substance contained within, and a control system for automated operation of the distribution system according to the invention.

BRIEF DESCRIPTION OF THE DRAWING

A preferred exemplary embodiment of a wax distribution system in accordance with the present invention will hereinafter be described in conjunction with the appended drawing, wherein like designations denote like elements, and:

FIG. 2B is a partial sectional view of a heat exchanger and outlet valve shown in the lower right corner of FIG. 2A;

FIG. 3A is a partial sectional view of the annular heat exchanger and annular piston of FIG. 2A;

FIG. 3B is a cross-sectional view of the annular heat exchanger taken along the line IIIB—IIIB in FIG. 3A;

FIG. 4A is a top view of the wax injection press of FIG. 1;

FIG. 4B is a side elevational view, partly in section, of the press of FIG. 4A taken along the line IVB—IVB in FIG. 4A;

FIG. 5 is a top plan view of the accumulator/heat exchanger combination of FIGS. 1 and 2A, shown wrapped in thermal insulation;

FIG. 7B is a flow diagram detailing the operation of the wax supply system shown in FIG. 1;

FIG. 8 is a front elevational view, partly in section, taken along the line VIII—VIII in FIG. 4B and extended to include the accumulator;

FIG. 9 is a schematic diagram of the hard wired portion of the system controller shown in FIG. 1;

FIG. 10 is a partial elevational view, partly in section, of the left side accumulator press unit of FIGS. 1 and 4;

FIG. 11 is a sectional view of the shot chamber piston shown in FIG. 10;

FIG. 12 is a schematic diagram of a temperature control system used in the wax distribution system according to the invention;

FIG. 13 is an elevational view of the piston stop shown in FIGS. 2A and 2B; and

FIG. 14 is an elevational view of the right heat exchanger outer end plate shown in FIGS. 2A and 2B.

DETAILED DESCRIPTION OF AN EXEMPLARY EMBODIMENT

Figure 1:
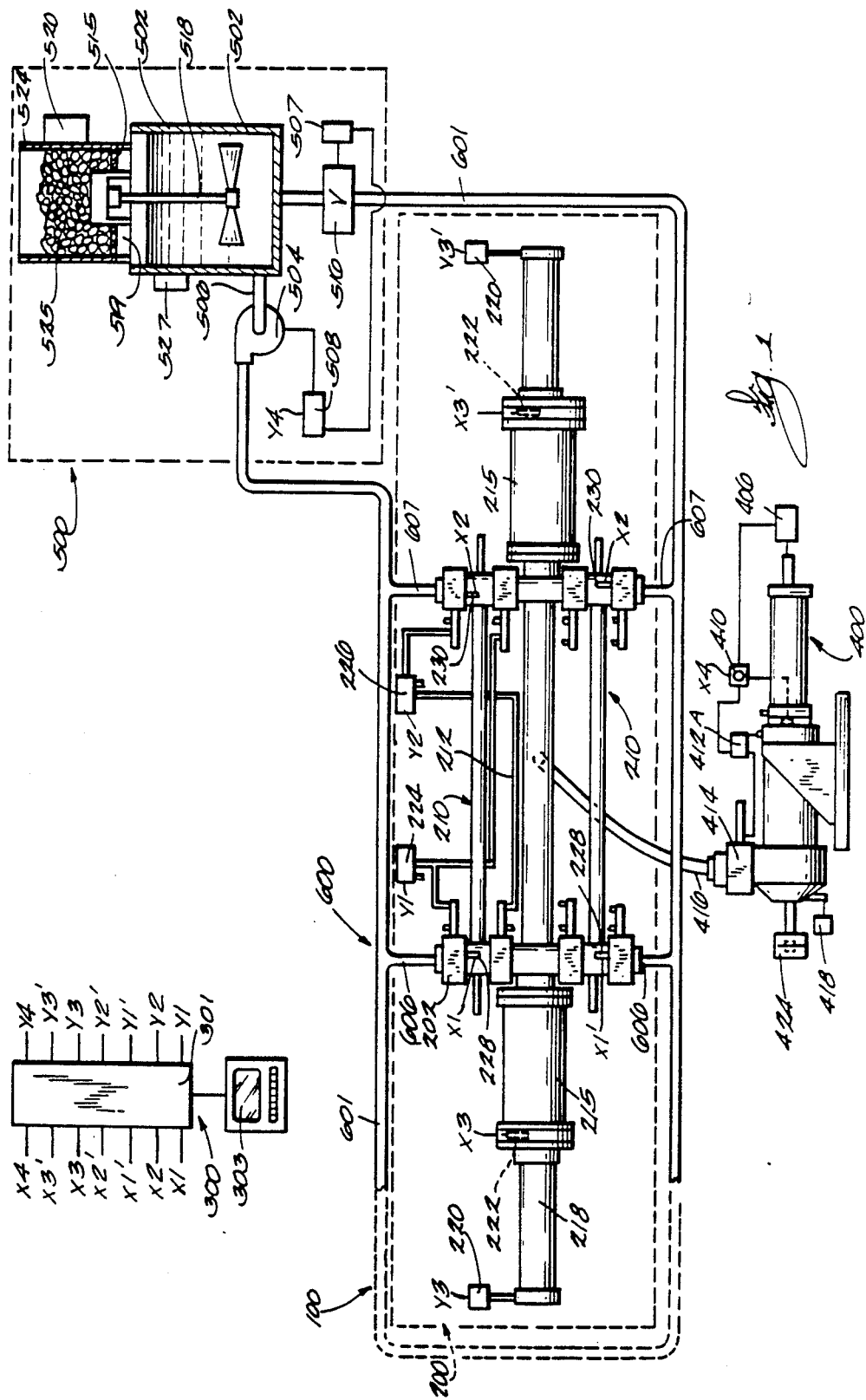
FIG. 1 is a schematic diagram of an exemplary wax distribution system constructed in accordance with the present invention, omitting the temperature control system.

Referring to FIG. 1, a wax distribution system 100, in accordance with the present invention, provides a continuous supply of semi-solid wax to one or more work stations, for example, a wax injection press 400. The system preferably includes a wax supply system 500 including a conduit network 600, a wax conditioning system 200, a wax injection press assembly 400, an automated control system 300, and a temperature control system 800. Wax injection press 400 in the following illustrative embodiment is a modified version of a conventional die press, such as Ebbert Engineering Company's Model No. 12320.

System 100 operates, in general, by pumping hot liquid wax from wax supply system 500 through conduits 600 into a heat exchanger 210 of conditioning system 200, wherein a predetermined delay ("dwell") is timed to allow the wax to cool to approximately the desired temperature for injection into wax injection press assembly 400. Upon cooling, the wax is discharged into an accumulator 212 where the desired temperature is maintained until wax injection press assembly 400 calls for wax as described hereafter. In the context of a preferred embodiment of the present invention, the desired injection temperature of wax is that temperature at which the wax is a semi-solid, i.e., is in a conditioned state. Typically, this is in the range of about 45°–52° C. for wax used in investment casting containing microcrystalline wax, resin additives, and optionally a filler.

"Semi-solid" as referred to herein means a condition assumed by wax or wax-like substances at a temperature just below the melting point of the substance at which the substance is in a transitional state from solid to liquid. Generally this range is from about 0° to 15° C. below the lower end of the melting point range for the substance. As is well known, some substances do not undergo such a transition. In the semi-solid state, a wax-like substance is flowable, but not to the extent that the liquid form of the substance is flowable. While liquid wax can be circulated using a conventional pump, semi-solid wax cannot be so circulated, and must instead be forced to flow by more powerful press units such as wax injection press 400.

Referring to FIG. 1, wax supply system 500 suitably includes a solid wax receptable tank 524, for example Bayhead Machinery Model Number MLT/100, into which virgin or recycled wax is deposited in the form of slabs, flakes or pellets 525. The wax is heated to a liquid state by a heater 520 and drips through an aperture or grate 515 at the bottom of tank 524 into a wax reservoir 502, for example Bayhead Machinery Model Number CON/250. In reservoir 502, an agitator unit 518, mounted by a support bar 519 to the upper rim of reservoir 502, keeps the liquid wax in constant motion.

Depending on the type of wax used and the tolerance range of the finished parts, solid wax substances or other filler, for example, granular isopthalic acid, may be added to the wax to reduce shrinkage. Thus, it is desirable to keep the liquid wax in constant motion to prevent this filler from settling out. A conventional heater 527 connected to reservoir 502 supplies sufficient heat to the liquid wax therein to keep it in liquid form during system operation. Conduits 600 are preferably insulated to prevent heat loss but do not require water jacketing or a similar heat exchange system for maintaining the liquid wax temperature.

The liquid wax is pumped from reservoir 502 out a discharge duct 506 by a pump 504 such as, for example, ARO Model Number 650645-11. Pump 504 suitably includes a solenoid-actuated pneumatic valve selector 508 which selects either a high or low pressure output mode in response to various conditions, as will be explained. A suitable selector is Model Number 3556504553P, made by the Parker Company. For liquid wax, a minimum pressure of about 1200 psi (84.4 kg/cm$^2$), preferably at least 1500 psi (105.5 kg/cm$^2$), must be maintained by pump 504 in high mode in order to effectively fill the heat exchangers. Low mode is selected to avoid wasting energy when system 100 is dormant. In low mode, the pump pressure need only be the minimum pressure sufficient to keep the liquid wax recirculating effectively. For wax, low pressure mode can be set as low as 10 psi (0.70 kg/cm$^2$).

A back pressure valve 516 is disposed in a recirculation line 601 downstream from each of a series branch lines 606, 607. Back pressure valve 516 is suitably a model If-B138CSF2-01, manufactured by WKM. A back pressure valve actuator 507 operates in tandem with selector 508 so that when pump 504 is discharging in the low pressure mode, actuator 507 opens valve 516 to recirculate wax through return line 601. Actuator 507 is suitably a Raymond Control Systems Model Number RC3-4020-DA. When pump 504 is discharging in high pressure mode, actuator 507 closes back pressure valve 516 so that all the wax enters conditioning assembly 200. High and low pressure modes of pump 504 and the state of valve 516 are varied as needed, either manually or by automated control system 300, to supply wax to wax conditioning unit 200.

Figure 2A:
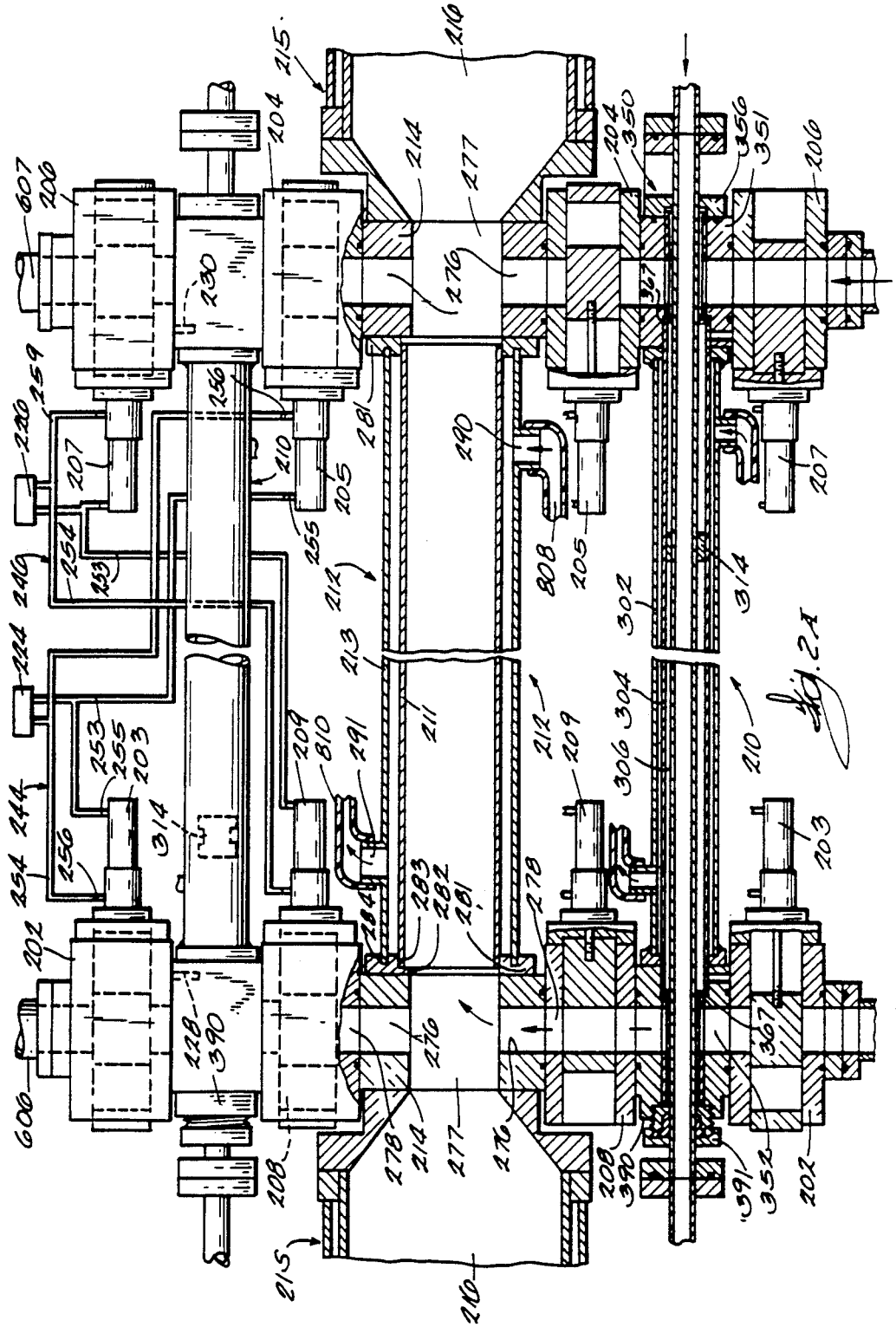
FIG. 2A is a partial plan view, partly in section, of the accumaltor/heat exchanger combination of the system shown in FIG. 1, including in schematic form valve couplet components for one of the heat exchangers shown.

Referring now to FIGS. 1 and 2A, wax conditioning assembly 200 includes a pair of identical heat exchangers 210 connected to opposite sides of accumulator 212. The main function of heat exchangers 210 is to cool liquid wax pumped from the wax supply system 500 to a semi-solid state suitable for use in wax injection press 400. Accumulator 212 holds a large quantity of semi-solid wax conditioned by heat exchangers 210 to meet the demands of one or more wax injection presses 400.

Each heat exchanger 210 has two independent valve couplets 244, 246 associated therewith which regulate the flow of wax therethrough. A first valve couplet 244 comprises a one inch diameter inlet valve 202 disposed between a branch feed line 606 of conduit system 600 and heat exchanger 210, a two inch diameter discharge valve 204 at the end of heat exchanger 210 remote from inlet valve 202, which valve 204 regulates wax flow between accumulator 212 and heat exchanger 210, a pair of hydraulic cylinders 203, 205 which actuate each of valves 202, 204, respectively, and a valve couplet control 224 which is connected to each of hydraulic cylinders 203, 205 to simultaneously open or close each of valves 202, 204.

Second valve couplet 246 comprises a one inch diameter inlet valve 206 disposed between a branch feed line 607 of conduit system 600 and heat exchanger 210, a two inch diameter discharge valve 208 at the end of heat exchanger 210 remote from inlet valve 206, which valve 208 regulates wax flow between accumulator 212 and heat exchanger 210, a pair of hydraulic cylinders 207, 209 which actuate each of valves 206, 208, respectively, and a valve couplet control 226 which is connected to each of hydraulic cylinders 207, 209 to simultaneously open or close each of valves 206, 208 as described hereafter. Valve couplet controls 224 and 226 are suitably Model Number DG4V3-2A-MW-B40, manufactured by the Vickers Valve Corporation. As shown in FIG. 2A, valves 202 and 208 are disposed at one end of heat exchanger 210 on opposite sides thereof, and valves 204 and 206 are similarly disposed at the other end of heat exchanger 210. This permits wax to be fed into heat exchanger 210 in either direction along its lenght, depending on which set of valves 202, 204 or 206, 208 are open.

Valve couplet controls 224 and 226 are conventional spring loaded 4-way valves which port hydraulic fluid through fluid supply lines 253, 254 to respective ports 255, 256 of each of cylinders 203, 205, 207 and 209 as shown. Each 4-way valve is connected to a source of pressurized hydraulic fluid and an ambient pressure source in a conventional manner to alternately cause extension and retraction of the associated cylinder pistons. Except as noted below, all of the valve controls used in the present invention to operate hydraulic cylinders are of this type and function in like manner.

Referring to FIG. 2B, which illustrates valve 206 in detail, hydraulic cylinder 207 includes a a cylindrical valve piston 264 disposed within an elongated, tubular valve chamber 260 formed in a valve housing 268. In the illustrated embodiment, valve piston 264 comprises a relatively large, cylindrical, metal valve head 272, a rod 273 operatively connecting piston 264 to hydraulic cylinder 207, and a rear piston 274 connected to rod 273 at the end thereof remote from front piston 272 which drives piston 264 in response to hydraulic fluid supplied from the associated couplet control 226.

Upon actuation of cylinder 207 by operation of couplet control 226, valve piston 264 is withdrawn to the open position shown in FIG. 2B. In open position, a transverse cylindrical bore 266 in piston 264 is brought into alignment with a wax flow passage 267 in housing 268, which flow passage 267 passes perpendicularly through valve chamber 260, allowing wax to flow from branch line 607 through valve 206 into a corresponding wax flow passage 376 in heat exchanger 210. Valves 202, 204 and 208 function in the same manner as valve 206, except that they are positioned and controlled differently as described above.

Referring now to FIGS. 2A, 2B, 3A and 3B, each heat exchanger 210 suitably comprises an outer shell (pipe) 302, a middle shell (pipe) 304, and an inner shell (pipe) 306, all coaxially disposed, which span a pair of end fitting assemblies 350 which hold pipes 302, 304, 306 in position and provide passages for input and output of wax from heat exchanger 210. Pipes 302, 304, and 306 are suitably made from low carbon steel. Steel is also used to fabricate most of the other structural pipes, fittings and the like used in the apparatus according to the invention, unless described otherwise below. Pipes 302 and 306 carry a heat exchange medium, preferably water or water mixed with an anti-corrosive additive, and middle pipe 304 carries wax. Pipes 302 and 306 communicate with temperature control system 800 as described hereafter. Annular piston 314 is disposed inside pipe 304 in close, slidable engagement with both of pipes 304, 306 as shown.

Annular piston 314 is suitably spool-shaped, i.e., comprises respective end flanges 310 and a central barrel 312 spanning flanges 310. Flanges 310, which engage the inner and outer surfaces of pipes 304 and 306 respectively, are suitably made from a plastic such as polyethylene, polyurethene, UHMW polyethylene, or any compatible material which minimizes frictional forces between piston 314 and the surfaces of pipes 304 and 306. Barrel 312 of piston 314 has a smaller outer diameter and a larged inner diameter than flanges 310 so that it does not engage pipes 304, 306. Barrel 310 includes a sleeve 311 mounted thereon by suitable means such as a threaded plastic ring 313. Sleeve 311 is made of steel or any similar magnetically attractable material to facilitate magnetic cooperation with respective proximity switches 228 and 230 (see FIG. 2A) positioned at opposite ends of each heat exchanger 210.

End fitting assemblies 350 each comprise a cylindrical housing 351 having a pair of mutually perpendicular bores (passages) 352, 353 therethrough. Housing 351 is made from a non-ferrous metal such as aluminum to avoid interference with the functioning of magnetic proximity switches 228, 230. A first bore 352 is oriented transversely to the lengthwise direction of heat exchanger 210 in alignment at respective opposites open ends thereof with the corresponding wax flow passage 267 of valve 202 or 206 and a similar wax flow passage 278 in discharge valve 204 or 208. Second bore 353 intersects first bore 352 centrally and thereby communicates therewith. Bore 353 has an inner end portion 354 of slightly enlarged diameter into which an end portion of pipe 304 is closely received and secured therein by any suitable means, such as welding. Other pipes similarly disposed in the apparatus according to the invention are similarly secured by welding except where described otherwise.

As shown in FIGS. 2A, 2B and 14, pipe 306 has a substantially smaller diameter than bore 353 and extends completely through it. Pipe 306 is closely received in a central bore 361 of an end plate 356 which is secured to housing 351 over the open outer end of bore 353. A sealing O-ring 357 is suitably disposed in an annular recess 355 in the outer surface of housing 351 in contact with end plate 356 to prevent leakage of wax from within the apparatus. Bore 361 further has a radially inwardly opening annular groove 369 therein in which a further O-ring 357 is disposed for preventing leakage along the outside of pipe 306. Similar sealing rings are shown elsewhere in the drawings for like purpose. End plate 356 is secured to housing 351 by any suitable fastening means, such as bolts (not shown) which extend through holes 360 in plate 356 and are received in threaded holes in the outer surface of housing 351. Similar bolts are used elsewhere in the apparatus according to the invention where necessary to removably secure the components thereof together.

As shown in FIGS. 13 and 14, bore 361 has an enlarged, inwardly facing end portion 363 which has the same diameter as bore 353. End portion (recess) 363 receives the outer end of a tubular spacer sleeve 364 which is inserted into bore 353. Sleeve 364 has suitable holes 365 therethrough so that it does not block bore 352. To keep holes 365 in alignment with bore 352, sleeve 364 has a suitable groove (not shown) in the outer end thereof which engages a corresponding tongue 366 on plate 356. The inner end of spacer 364 abuts a stop ring 367 which is press-fitted onto pipe 306 and inserted into bore 353 past bore 352 to define a mechanical stop for annular piston 314. Ring 367 has a series of radially inwardly extending projections 368 having arcuate inner ends which engage the surface of inner pipe 306 and allow flow of wax therebetween.

As shown in FIG. 2A, a similar mechanical stop is disposed at the other end of heat exchanger 210 so that annular piston 314 is suitably confined in the event that limit switches 228, 230 fail. However, right side end plate 390 shown in FIG. 2A differs from left side end plate 356. It has been found that inner pipe 306 undergoes thermal expansion when in use, and that annular piston 314 tends to push pipe 306. Thus, to prevent unwanted movement of pipe 306, end plate 390 includes a compression fitting 391 which secures pipe 306 against lengthwise movement. However, to allow for thermal expansion, pipe 306 can slide along seal ring 357 of the other end plate 356. The weight of water within pipe 306 can also cause it to sag slightly along its length. The flexibility of plastic flanges 310 of annular piston 314 allows piston 314 to move along the outside of pipe 306 without becoming stuck.

Returning to FIG. 2B, an inner end plate 371 is secured to an inner wall of housing 351. Inner end plate 371 has a central hole 372 which has the same diameter as enlarged portion 354 of bore 353 and is adjacent thereto so that pipe 304 fits closely to the inner periphery of hole 372. Inner end plate 371 also has a inwardly opening, shallow cylindrical recess 373 in which outer pipe 302 is closely received and secured therein.

Liquid wax from the associated valve 206 (or 202) flows into end fitting assembly 350 through bore 352 to an annular flow passage 376 between housing 351 and the exterior of inner pipe 306, and then into the adjoining space between pipes 304 and 306, pushing annular piston 314 along the length of pipes 302, 304, 306 towards the other end fitting 350. Wax on the other side of annular piston 314 has been within heat exchanger 210 long enough to cool to a semi-solid state. Absent piston 314, the fresh liquid wax newly entering heat exchanger 210 would be in direct contact with the semi-solid wax which had entered heat exchanger 210 from the other direction. Liquid wax under pressure against semi-solid wax will generally tunnel through its less-solid center, generally defeating the purpose of the heat exchanger. Annular free piston 314 prevents such tunneling because piston 314 is physically interposed between the hot incoming wax and the cooler semi-solid outgoing wax. Valve couplet controls 224 and 226 are operated alternately to shuttle annular piston 314 back and forth within heat exchanger 210, alternately discharging semi-solid wax from discharge valve 204 or 208 into accumulator 212. The cycle is timed to include a dwell period to ensure that the wax remains in heat exchanger 210 long enough to reach the desired temperature. During a dwell period, annular piston 314 remains stationary at one of its two endmost positions.

Suitable means, such as a pair of magnetic proximity switches 228 and 230, mounted at respective opposite ends of heat exchanger 210 in each of end fitting assemblies 350, track the travel of piston 314 and regulate the operation of couplet controls 224 and 226. Switches 228, 230 sense the approach of barrel 312 of annular piston 314 and cause the control system 300 to close the corresponding open valves 202, 204 or 206, 208 to begin a dwell period. Couplet controls 224, 226 then reverse the orientation of valves 202, 204, 206, 208 from their orientation prior to dwell to thereby reverse the direction of travel of piston 314. The action of piston 314 forces wax out of heat exchanger 210 and into accumulator 212 through annular passage 376, bore 352, and valve 208 in the direction of the arrows shown in FIG. 2A.

Referring now to FIGS. 2A, 5 and 10, wax conditioning assembly 200 further comprises an accumulator 212 which includes a central reservoir (pipe) 211 connected at opposite ends thereof for communication with a pair of four-way manifolds 214, which are in turn connected for communication with shot chambers 216 of a pair of wax pressing units 215 disposed in opposing positions on opposite sides of pipe 211 in its lengthwise direction. An accumulator shot chamber piston 232 is disposed in close, slidable contact with the interior of each shot chamber 216 for lengthwise movement within each chamber 216. A pair of shot chamber hydraulic cylinders 218, for example Ortman Model Number 3THB6X20, NC-6-1, are disposed at opposite ends of accumulator 212 and are operatively connected to each shot chamber piston 232 in each accumulator shot chamber 216.

A pair of inner end plates 281 are secured in opposing positions to respective inner walls of manifolds 214. Each plate 281 has a stepped central hole 282 extending therethrough which coincides with a bore 277 in manifold 214. Each hole 282 further has an inwardly opening, enlarged diameter portion 283 therein into which respective opposite ends of pipe 211 are closely received. An outer pipe 213 disposed coaxially with and outside of pipe 211 contains a heat exchange medium which keeps wax within pipe 211 at a constant predetermined temperature. Each plate 281 further has an annular, inwardly opening recess 284 disposed radially outwardly from hole 282 into which respective opposite ends of pipe 213 are closely received. Pipe 213 has a temperature control medium inlet 290 and outlet 291 which are connected by hoses 808, 810 respectively to temperature control system 800.

Referring to FIG. 10, wax pressing units 215 each comprise a generally cylindrical housing 231 defining a shot chamber 216 therewithin, a shot piston 232 disposed for lengthwise movement within shot chamber 216, and a hydraulic cylinder assembly 218 which actuates shot piston 232. A shot chamber hydraulic port 221 is disposed at the distal end of shot chamber hydraulic cylinder 218 and is controlled by a hydraulic cylinder solenoid control valve 220 of conventional design which operates in a manner similar to valve couplet controls 224, 226. A shot chamber limit switch (ACC MSW) 222 is disposed on a rear end wall 223 of shot chamber 216 to sense contact with accumulator shot chamber piston 232. ACC MSW 222 is suitably a Model Number 914CE3-3 switch, made by MICRO-Switch, Inc.

Housing 231 preferably comprises a tubular sleeve 331, an outer round end plate 332 secured to the outer end of sleeve 331, and a ring 333 having a frustoconical central hole secured to the inner end of sleeve 331. Ring 333 is secured at the inner end thereof directly to the associated manifold 214. In the illustrated embodiment, end plate 332 and ring 333 are each actually assembled from a pair of stacked rings or plates as shown. A pair of rings 336, 337 are mounted outside of sleeve 331 at opposite ends thereof and are secured by bolts 338 to end plate 332 and ring 333, respectively. An outer tubular sleeve 341 is welded to rings 336, 337 coaxially with sleeve 331 for supplying temperature control medium to the outside of sleeve 331. Outer sleeve 341 has a temperature control outlet 342 and inlet 343 thereon which communicate with temperature control system 800 as described hereafter. Ring 333 is configured so that the outer end diameter of its central hole 340 matches the inner diameter of sleeve 331, and its inner end diameter matches the diameter of bore 277. This allows piston 232 to exert greater force on wax within manifolds 214 and pipe 211.

With specific reference to FIG. 10, accumulator hydraulic cylinder 218 contains a piston 234 which comprises a piston rod 236 having a piston head 382 secured at one end thereof. Piston head 382 is closely slidably received in tubular cylinder housing 383. Hydraulic fluid fed into port 221 outwardly of piston head 382 forces piston inwardly (to the right) in FIG. 10. Hydraulic fluid which leaks past piston head 382 is removed from cylinder 218 through return port 225. The inner end of rod 236 is slidably received in a rearwardly opening recess 384 in shot piston 232. Actuation of cylinders 218 causes both of shot pistons 232 to force wax within each of shot chambers 216 inwardly. The foregoing structure allows shot chamber piston 232 to "float" in shot chamber 216 because rod 236 is not rigidly secured to shot piston 232. This prevents the hydraulics from "sucking" piston 232 to the left in FIG. 10, which might create undesirable voids within the wax disposed in shot chambers 216. Thus, extension of piston 232 is regulated by control valve 220, but retraction thereof is caused by the action of the semi-solid wax discharged from heat exchanger 210.

As shown in FIG. 11, piston 232 is sealed within shot chamber 216 by means of a series of seals 238. Seals 238 suitably comprise a first plastic sealing ring 902 which is U-shaped in cross-section disposed in a circular groove 903 about the circumference of piston 232. Ring 902 has an elastomeric O-ring 908 inserted therein as shown. Seals 238 further comprise a pair of second and third sealing rings 904, preferably made of ultra-high molecular weight plastic, disposed in respective annular cylindrical grooves 906 about piston 232. Sealing rings 904 are preferably rectilinear in cross-section, and are disposed in spaced apart positions proximate opposite ends of piston 232 to provide suitable bearing surfaces for piston 232. First sealing ring 902 is preferably disposed close to the front end of piston 232 ahead of rings 904 to prevent wax from becoming lodged between piston 232 and the surface of sleeve 331 insofar as possible. Piston 232 also has a small lengthwise passage 911 extending therethrough which allows air to escape from shot chamber 216 the first time accumulator 212 is filled. Thereafter, passage 911 is sealed off with a plug 912. A shot piston 232 according to this embodiment of the invention has proven highly effective and reliable for pumping wax from accumulator 212.

Wax enters accumulator 212 through transverse bores (flow passages) 276 in manifolds 214 which are in direct communication on opposite sides thereof with flow passages 278 of valves 204 and 208 (see FIG. 2A). Each manifold 214 further has a bore 277 in the lengthwise direction of of accumulator 212 which intersects with bore 276 and allows communication between shot chambers 216 and the interior of pipe 211. Thus, wax fed from either end of each bore 276, depending on the cycle of heat exchangers 210, enters bore 277 and can flow into either the interior of pipe 211 or into the adjoining shot chamber 216. The cycle of shot pistons 232 determines the direction in which the wax will flow.

When control valve 220 is actuated, meaning that wax injection press assembly 400 is calling for wax as described below, pressurized hydraulic fluid is ported to the outer side of each hydraulic cylinder piston 234 through port 221, urging pistons 234 inwardly. With reference to the left side shot chamber 216 shown in FIG. 10, connecting rod 236 urges shot chamber piston 232 to the right, forcing wax through accumulator manifold 214 and into central pipe 211 of accumulator 212 (see FIG. 2A), and then through a conduit 416 (see FIG. 1) to wax injection press 400. When wax injection press assembly 400 terminates its call for wax, control valve 220 terminates forward movement of hydraulic cylinder piston 234 and shot chamber piston 232. Heat exchangers 210 can then continue to discharge semi-solid wax into accumulator 212, forcing accumulator shot chamber piston 232 back (to the left in FIG. 10), until both of pistons 232 are in fully retracted positions.

The size of shot chambers 216 determines the capacity of accumulator 212. Shot chambers 216 preferably can hold enough wax to fill shot chamber 402 of injection press 400. If several presses 400 are connected to accumulator 212, chambers 216 should be large enough to fill the shot chambers of all of the injection presses. The size of pipe 211 is also important to proper functioning of accumulator 212. If pipe 211 is too small in diameter, friction generated when the wax is pressed will overheat the wax. A diameter of about 4 inches (10.26 cm) for pipe 211 has proven satisfactory in practice.

As shown in FIGS. 1, 2A, and 5, the wax conditioning system of the subject invention accommodates multiple heat exchanger/valve couplet combinations in cooperation with a single accumulator. Additionally, shot chamber/hydraulic cylinder assemblies are placed at both ends of accumulator 212, resulting in more economical, efficient operation.

Referring now to FIGS. 8, 4A and 4B, die press 400 suitably comprises a housing 401 defining a generally cylindrical press shot chamber 402 in its interior, a die piston 430 closely and slidably received in shot chamber 402, a press hydraulic cylinder 404 for actuating die piston 430, an injection valve head 440 for receiving wax from accumulator 212 and feeding it to a die 424, a feed valve 414 which regulates the flow of wax into shot chamber 402 from accumlator 212, and an injection guillotine valve 420 which permits the flow of wax from a front opening 405 of shot chamber 402 into die 424. Valve head 440 has a forwardly tapering frustoconical cavity 428 which comprises the forward part of shot chamber 402. Conduit 416, shown in FIG. 8, penetrates pipe 213 and connects the interior of pipe 211 near the center of acumulator 212 with feed valve 414 of wax injection press 400.

Referring to FIG. 8, conduit 416 preferably comprises a metal T-branch pipe 421 which is integral with pipe 211 and extends outwardly therefrom through pipe 213. A downwardly directed outlet of pipe 421 is coupled to a flexible hose 417 by an inner coupling 427. An outer flexible hose 419 surrounds inner hose 417 and is secured thereto by an outer coupling 429 disposed outside of inner coupling 427 and depending from pipe 421. The heat exchange medium is circulated between the outer surface of hose 417 and the inner surface of hose 419 by means of an inlet and an outlet (not shown) to maintain the desired injection temperature of the wax contained within conduit 417. Inner flexible hose 417 carries conditioned wax through to inlet valve 414, to which hoses 417, 419 are secured by a corresponding pair of inner and outer couplings 431, 432, respectively. Valve 414 is constructed in substantially the same manner as valves 202, 204, 206, 208, and has a wax flow passage 433 therein through which wax from hose 417 flows into a corresponding vertical flow passage 434 in valve head 440 which opens into shot chamber 402.

FIGS. 4A and 4B illustrate the wax injection press 400 in detail. Press shot chamber 402 intermittently communicates with conduit 416 through the operation of discharge valve 414. With specific reference to FIG. 4B, discharge valve 414 includes a small hydraulic cylinder 415 and is actuated by a discharge valve solenoid valve control 412, for example, a Vickers Model Number DG4V-3-2C-M20-B40.

Valve control 412 includes a double-acting solenoid. When a first solenoid 412A is energized and a second solenoid 412B is deenergized, discharge valve 414 is opened. When second solenoid 412B is energized and 412A is deenergized, discharge valve 414 is closed. Valve control 412 is operatively connected to a counter 410 and a press limit switch (MSW) 408 mounted at the rear of shot chamber 402 and actuated by contact with shot piston 430 when it reaches its rearwardmost position. MSW 408 can be any conventional mechanical switch which senses the fully retracted position of piston 430, for example, Model Number 914CE3-3, manufactured by MICRO-Switch, Inc. MSW 408 energizes solenoid 412B to close valve 414 when shot chamber 402 is completely filled with conditioned wax. A suitable counter is Model Number H7CN-YLN, made by the Omron Electronics Corporation. Counter 410 energizes solenoid 412A, opening valve 414, when counter 410 decrements (or is manually set) to zero. Counter 410 decrements, as described hereafter, each time wax injection press 400 injects wax into die 424. By pre-setting counter 410 to an appropriate starting value, valve 414 will open when wax injection press 414 is low on wax and remain open until it is refilled with wax, i.e., when the wax in chamber 402 pushes piston 430 back into contact with limit switch 408.

With continued reference to FIGS. 4A and 4B, shot chamber piston 430 has a peripheral seals 438 which are preferably the same as shown in FIG. 11 for shot chamber pistons 232. Press hydraulic cylinder 404, for example an Ortman Model Number 3THB 6X15 NC-6-1, suitably contains a hydraulic cylinder piston 432. A press hydraulic cylinder control valve 406 controls shot chamber piston 430 in the same manner in which control valve 220 controls accumulator shot chamber piston 232, as decribed above. Press shot chamber piston 430 and press hydraulic cylinder piston 432 are sealed to their respective housings in much the same way accumulator hydraulic cylinder piston 234 and accumulator shot chamber piston 232 are sealed. In like manner, shot chamber piston 430 has a rearwardly opening recess 426 which receives the front end of piston 234 so that piston 430 can become separated from piston 234 and float in the same manner as pistons 232.

Valve head 440 preferably includes a rectilinear network of internal passages 442 which are disposed near and in surrounding relationship to either or both of conical cavity 428 and wax flow passage 434. A heat exchange medium, e.g., water, circulates through network 442. As shown in FIG. 8, network 442 has an outlet 443 and inlet 444 which are connected by hose 446 to a temperature control system (not shown) separate from but having the same basic components as temperature control system 800. Die press 400 is preferably connected to the same separate temperature control system. Shot chamber 402 communicates with an injection tube 422 at the narrow front end of conical cavity 428. Tube 422 extends forwardly from valve 420 to die 424. Shot chamber 402 intermittently communicates with die 424 via tube 422 as determined by the position of injection valve 420. Injection valve 420 is preferably a guillotine valve actuated by a hydraulic cylinder 436, the condition of which is controlled by an injection solenoid control valve 418, for example, a Vickers model number DG4V3-2A-MW-B40.

When die 424 requires an injection of wax, control valve 418 ports high pressure hydraulic fluid, e.g., oil, to hydraulic cylinder 436 to open injection valve 420 and establish communication between shot chamber 402 and die 424 via tube 422. Control valve 406 then actuates cylinder 404 to cause shot piston 430 to press conditioned wax into die 424. After die 424 is filled and a suitable waiting period has expired, control valves 406 and 418 then operate to deactivate cylinder 404 and close valve 420, respectively.

FIG. 12 illustrates an exemplary temperature control system 800 according to the invention which includes a heat exchange medium tank 802, immersion heater 804, pump 806 and flow lines 808, 810. In general, the heat exchange liquid is kept at a constant temperature in tank 802 by means of heater 804, which temperature is selected to keep the wax or similar substance in a semi-solid state. Pump 806 continuously circulates the heat exchange liquid through lines 808 to the various inlets for heat exchangers 210 and accumulator 212 as described above. Return lines 810 connected to the heat exchange medium outlets of the various system components conduct the heat exchange liquid back to tank 802. System 800 is operated so that temperature variation in systems 200 and 400 is minimized. Generally, this requires the heat exchange medium to be circulated at a relative rapid rate, e.g. at least about 18 gallons per minute for the system exemplified herein. Lines 808, 810 preferably comprise flexible hoses.

As illustrated in FIG. 5, the entire wax distribution system 100, to the extent space considerations allow, is wrapped in thermal insulation 820. Because of the size and complexity of system 100, it is preferable to use insulation which can be easily wrapped and taped around irregularly shaped pipes, valves, fittings, etc. For example, Manville ARMAFLEX may be used on the heat exchanger; Manville R-11 fiberglass may be used on the accumulator, and Manville Micro-lok fiberglass may be used for the remainder of the conduit network. In addition, as illustrated in FIGS. 4A and 4B as to passages 442, all valve heads, valves, and hydraulic connectors, to the extent mechanical considerations allow, preferably have a network of internal passages for circulating the heat exchange medium therethrough.

The heat exchange medium referred to above may be, for example, water or water mixed with an anti-corrosive additive such as Rust Raider, part number B5-34, made by the Radiator Specialty Company. This medium is circulated through the jacketing system described above which surrounds the major components of the system. For example, as shown in FIG. 2B, hot wax enters the annulus defined by pipes 304 and 306 and is cooled by the water which circulates through pipes 302 and 306. Water enters pipe 302 through an inlet 295 and exits pipe 302 through an outlet (not shown) at the opposite end of heat exchanger 210. As a result of the water jacketing and external insulation, the present system is capable of maintaining wax temperature at injection tube 422 within a narrow temperature range, typically within about ±0.5° C. A temperature control system according to the foregoing design, including suitable means for circulating the temperature control medium and insulating the system for minimizing heat loss, allows the wax distribution system according to the invention to provide wax for injection with greater uniformity and temperature control precision than in a system lacking such features.

Referring now to FIGS. 1, 9 and 10, operation of wax distributing system 100 is controlled by a control system 300 which includes a PLC (programmable logic controller) 301 which is operated by a programmable computer 303. PLC 301 may be Model Number EX40 2MARB5, Serial Number 6205613, manufactured by Toshiba International Corporation. PLC 301 receives and sends signals from a series of respective input (X) and output (Y) terminals as follows:

| Terminal: | Connected to: |
| --- | --- |
| X1 | Heat exchanger proximity switch 228 |
| X2 | Heat exchanger proximity switch 230 |
| X1' | Second proximity switch 228 |
| X2' | Second proximity switch 230 |
| X3 | Accumulator limit switch 222 |
| X3' | Second limit switch 222 |
| X4 | Counter 410 |
| Y1 | Heat exchanger valve couplet control 224 |
| Y2 | Heat exchanger valve couplet control 226 |
| Y1' | Second valve couplet control 224 |
| Y2' | Second valve couplet control 226 |
| Y3 | Accumulator cylinder control valve 220 |
| Y3' | Second cylinder control valve 220 |
| Y4 | Pump selector 508 |

Figure 6:
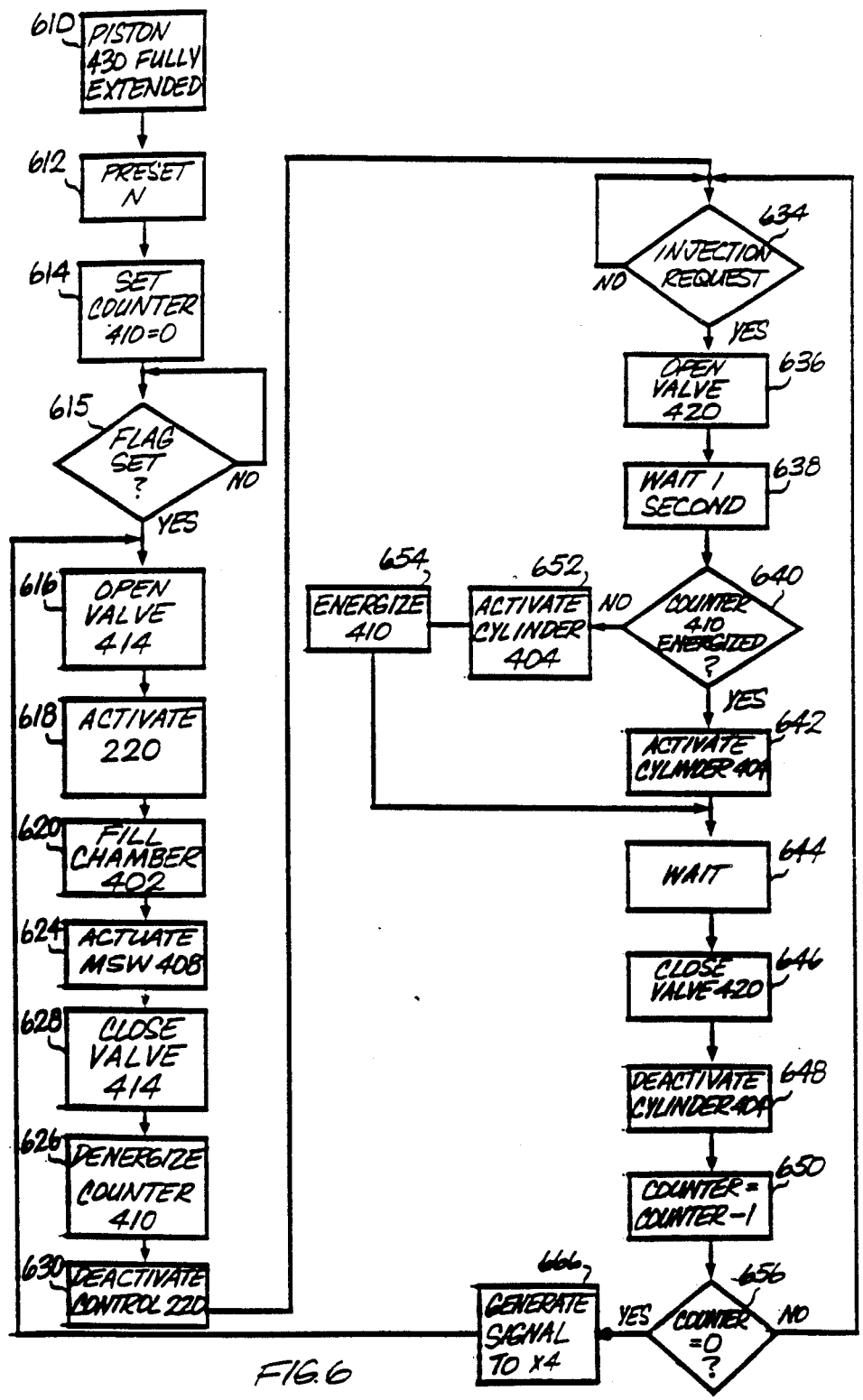
FIG. 6 is a flow diagram detailing the operation of the wax injection press assembly of FIG. 1.
Figure 7A:
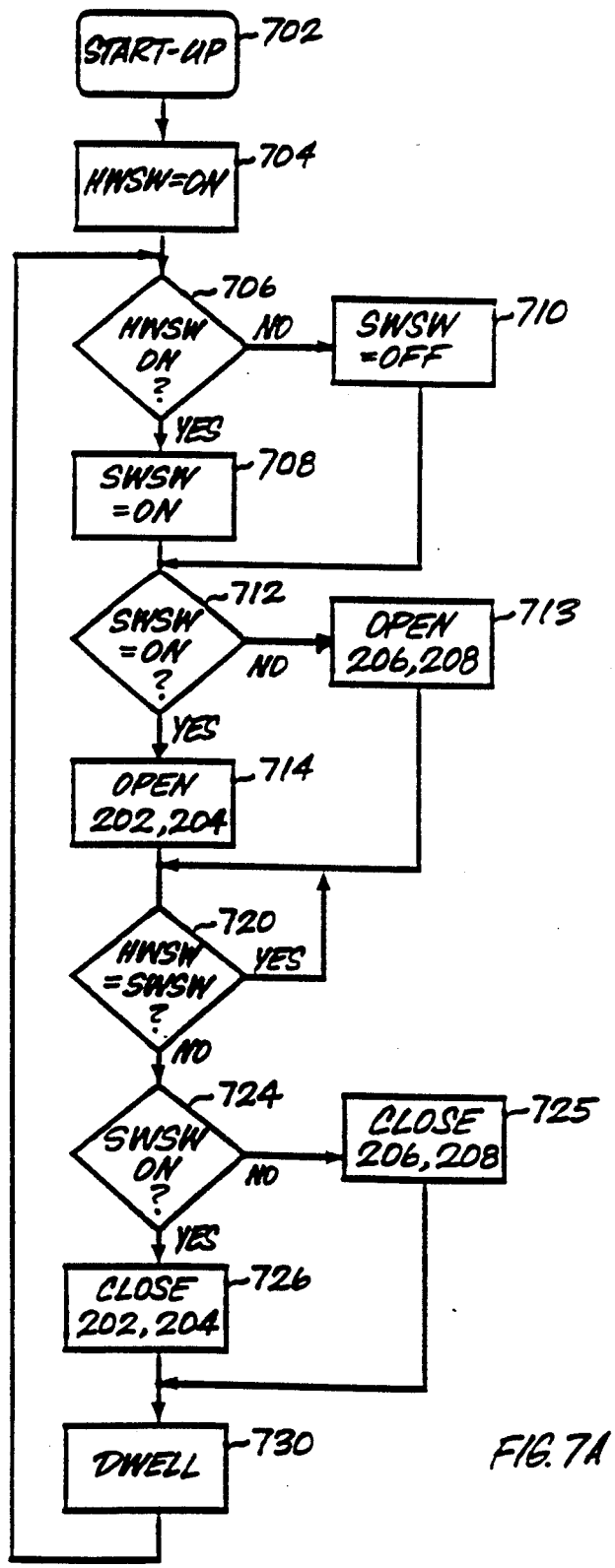
FIG. 7A is a flow diagram detailing the operation of the heat exchangers in the wax conditioning system shown in FIG. 1.
Figure 21:
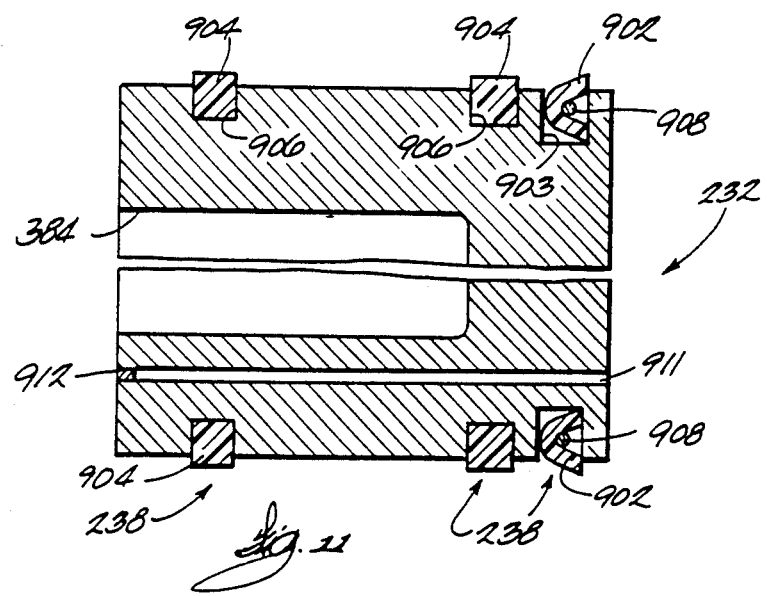
Figure 22:
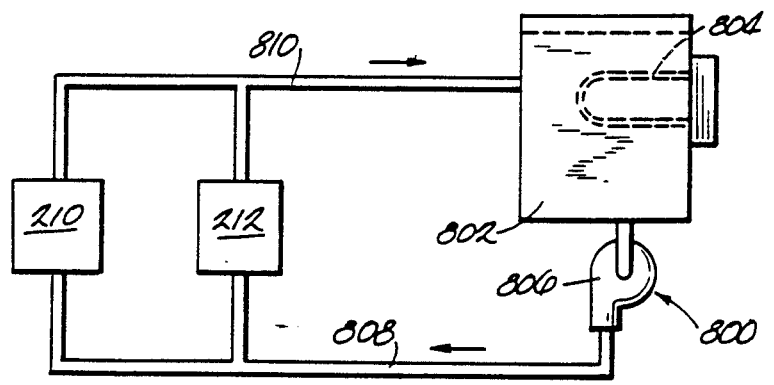

PLC 301 processes input and output signals in accordance with software loaded into the memory of computer 303, the logic and design of which will be apparent from the flow charts of FIGS. 6, 7A and 7B.

Referring now to FIGS. 4B, 6, and 8-10, injection press assembly 400 generally operates independently of the rest of the system, and is controlled by conventional servos, relays, and valves. Wax injection press assembly 400 receives conditioned wax from accumulator 212 and injects a sufficient amount of wax to fill die 424 in response to a request for an injection. This request may be generated automatically, in the case of automated presses, or manually, e.g. a switch 407 thrown by an operator which actuates cylinder control 406 and valve control 418.

Prior to system start-up, the following steps are performed, if needed:

(1) shot chamber piston 430 is fully extended, e.g., by operating cylinder 404 manually, so that it adjoins cavity 428 to minimize the amount of air in shot chamber 402 (FIG. 6, step 610); and (2) Counter 410 is preset to a positive integer value "N", which preferably corresponds to the volume ratio between press shot chamber 402 and die 424, i.e., the number of times shot chamber 402 can fill die 424 before needing more wax. The desired value for N is programmed into counter 410 (step 612). The value of N can be selected so that press shot chamber 402 is refilled at any convenient interval, regardless of whether the number of injections corresponds to complete depletion of the wax contained in shot chamber 402.

With continued reference to FIG. 6, operation of wax injection press assembly 400 is initiated by setting counter 410 to zero, indicating that press shot chamber 402 is calling for wax (step 614). PLC 301 then checks an internal flag which is set the first time both of switches 222 are tripped by engagement with pistons 430, and waits until this flag has been set (step 615). The flag will be set the first time signals are received at terminals X3 and X3', and will remain set thereafter. Check step 615 need occur only once, the first time accumulator 212 is filled with wax, to ensure that the system is ready to handle the initial call for wax. After the initial fill-up no further check of this kind is needed because the capacity of accumulator 212, heat exchangers 210 and wax supply system 500 is great enough to serve the number of wax injection presses 400 which may be connected to accumulator 212 without seriously depleting the supply of wax in shot chambers 216. After the initial filling of accumulator 212, counter 410 generates a signal directly to discharge valve actuator solenoid 412A to open discharge valve 414, establishing communication between press shot chamber 402 and discharge conduit 416 (step 616). At all times during which counter 410 has a zero value, a signal is sustained from counter 410 to terminal X4 of PLC 301.

The signal received at terminal X4 of PLC 301 causes PLC 301 to generate a signal at terminal Y3 of PLC 301, which signal actuates accumulator shot chamber control valves 220 (step 618). This causes hydraulic cylinder piston 234 and accumulator shot chamber piston 232 to force wax from accumulator 212, through discharge conduit 416 and open valve 414, and into press shot chamber 402 (step 620).

Press shot chamber 402 continues to fill with wax until press shot chamber piston 430 is fully retracted and contacts MSW 408 (step 624). Actuation of MSW 408 terminates power to counter 410 (step 626) and causes counter 410 to enter a null state. In this null, deenergized state, counter 410 has no value; it is not zero, but it is also not any other positive number. In this state, the signal sustained between counter 410 and terminal X4 of PLC 301 for as long as counter 410 has a zero value is terminated. When this signal is terminated, PLC 301 terminates the signal from terminal Y3 of PLC 301 to terminate actuation of accumulator hydraulic cylinder control valves 220 (step 630). Thus, when press shot chamber 402 is full, accumulator cylinders 218 are deactivated to terminate filling. In addition, MSW 408 energizes valve actuation solenoid 412B, closing discharge valve 414, thus terminating communication between press shot chamber 402 and discharge conduit 416 (step 628).

Having filled press shot chamber 402, die press assembly 400 waits for a request for an injection into die 424 (step 634). The request for an injection of wax into die 424 is received by injection valve actuator 418, which opens injection valve 420 (step 636). Valve 420 is a guillotine valve which, when closed, shears the wax after die 424 is filled. To ensure that valve 420 is fully opened before commencing injection into die 424, a one second delay is timed (step 638). A determination is then made whether counter 410 is energized (step 640). Counter 410 is deenergized in the preceding step 626. If the current injection request is the first such request since filling shot chamber 402, counter 410 will still be deenergized. In that event, counter 410 will not be sustaining a signal to terminal X4 of PLC 301 and will not have any "count" value. If the decision at step 640 is no, press hydraulic cylinder 404 is actuated (step 652), and MSW 408 is activated as press shot chamber piston 430 leaves its fully retracted position. Activation of MSW 408 energizes counter 410 resets it to N (step 654).

Returning to step 640, if counter 410 is energized (the decision at step 640 is yes), the value of counter 410 will be greater than zero but less than N. In that event, press hydraulic cylinder 404 is actuated (step 642) to begin filling die 424. Piston 430 will be in an intermediate position within shot chamber 402, in other words, it will already have moved away from limit switch 408.

Actuation of hydraulic cylinder 404 forces wax out of shot chamber 402 and into die 424. Control valve 406 causes cylinder 404 to urge shot piston 430 inwardly for a predetermined period of time sufficient to ensure that die 424 is completely filled with semi-solid wax and the wax has become completely solid (step 644). When the wait is over, actuator 418 closes injection valve 420 to terminate communication between die 424 and press shot chamber 402 (step 646). At the same time, control valve 406 deactivates press hydraulic cylinder 404 (step 648).

Counter 410 is then decremented to track the number of injections remaining in press shot chamber 402 (step 650). In the illustrated embodiment, counter 410 is connected to valve control 406 and decrements each time valve control 406 is actuated. However, any cycle-indicative event may be used to decrement counter 410, for example, the opening or closing of injection valve 420, or the injection request itself.

After decrementing counter 410, a determination is made (step 656) whether counter 410 has a zero value. If the answer is yes, counter 410 will send and maintain a signal at terminal X4 of PLC 301 (step 666) and the system returns to step 616 to refill shot chamber 402. If the answer is no, indicating that counter 410 has a value greater than zero, the system returns to step 634 and waits for an injection request. Steps 634 to 656 are repeated N times until counter 410 counts down to zero. When counter 410 reaches zero, the answer to decision 656 is yes, and the system returns to step 616 to refill press shot chamber 402 with conditioned wax.

According to the foregoing embodiment of an automated control system according to the invention, wax injection press assembly 400 requests accumulator 212 to fill press shot chamber 402 immediately when counter 410 decrements to zero. Counter 410 initiates refilling of shot chamber 402 before die 424 can request another injection of wax. Thus, injection requests will not be handled until refilling of chamber 402 has been completed.

Referring again to FIG. 1, selector 508 initially selects low pressure output from pump 504 so that wax leaves discharge duct 506 at low pressure and is recirculated through line 601 back to reservoir 502. Selector 508 is electrically connected to terminal Y4 of PLC 301. When a signal is generated at terminal Y4, selector 508 selects high pressure discharge from pump 504. When a signal is not present at terminal Y4 of PLC 301, selector 508 selects low pressure output from pump 504. The state of terminal Y4 is determined by the state of terminals X3, X3' connected to limit switches 222 of accumulator 212. When shot chambers 216 are initially filled, such that accumulator shot chamber pistons 232 are fully retracted and in contact with switches 222, no signals are sent to terminals X3, X3'. When pistons 232 leave switches 222 in response to a call for wax from wax injection press 400, a signal is sent to each of terminals X3, X3'. As long as a signal is present at either of X3 or X3', one or both of pistons 232 are off their fully retracted positions, and PLC 301 generates a signal at terminal Y4, in response to which selector 508 causes pump 504 to operate in high pressure mode. Limit switches 222 thus function in a dual manner to provide a threshold whereby calls for wax are ignored until accumulator 212 is initially filled, and to control the state of valve couplets solenoids 224, 226.

Referring now to FIGS. 1, 2A, 6 and 7A, continuous operation of wax supply system 500 and wax conditioning system 200 commences with system initialization (step 702). This includes all operations needed prior to filling the system with wax for the first time, including turning on the temperature control system 800, filling wax reservoir 502 with heated liquid wax, turning pump 504 on in low mode, programming computer 303 as to operator determined variables, e.g. the lengths of delays, and initializing wax injection press 400 (steps 610-614). Initially, none of switches 228, 230 have been tripped, so that valve couplet controls 224 and 226 are in an inactive condition and all of valves 202, 204, 206 and 208 are closed.

FIG. 7A illustrates the sequence that each of heat exchangers 210 follows in normal operation, assuming that accumulator 212 is not full and that pump 504 is in high pressure mode. The number of heat exchangers that can be used in a wax distribution system according to the invention is not particularly limited. In the illustrated embodiment utilizing two heat exchangers 210, both heat exchangers 210 follow the logic of FIG. 7A independently, and may or may not be synchronized at any given time.

Pump 504 will normally remain in high pressure mode constantly unless any one of two possible conditions exist. First, if limit switches 222 have both been tripped, indicating that accumulator 212 is full, control system 300 will cause pump 504 to switch to low pressure mode, back pressure valve 516 to open, and all valves 202, 204, 206 or 208 of heat exchangers 210 to close. The system will remain in this state until one of switches 222 is turned on again, indicating that accumulator 212 is no longer full. This occurs when a wax injection press 400 calls for wax, i.e. at step 618 when pistons 232 leave switches 222.

Second, if the control system 300 detects that a heat exchanger 210 is about to enter a dwell state, the waiting period in which annular piston 314 remains stationary so that the wax within heat exchanger 210 can cool, and all other heat exchangers are also in a dwell state, pump 504 is switched to low pressure mode and valve 516 is opened so that the liquid wax in conduit system 600 can recirculate. In a system having only one heat exchanger 210, if a dwell is initiated during a period when a signal is present at port X3, the corresponding output signal at port Y4 to selector 508 will be interrupted until the dwell is completed. However, in a system employing a plurality of heat exchangers, it is unlikely that all heat exchangers will be at dwell at any given instant. As long as at least one heat exchanger is not at dwell, Control system 300 will cause selector 508 to select "high" pump discharge at all times when accumulator shot chamber pistons 232 are not in their fully retracted positions. Once any one heat exchanger 210 leaves dwell and one of inlet valves 202 or 206 open (steps 713, 714), valve 516 closes and pump 504 returns to high pressure mode.

Turning now to the cyclic operation of heat exchangers 210, each pair of switches 228, 230 functions effectively as a hardware toggle switch, hereafter abbreviated HWSW, which is on when piston 314 last triggered switch 228 and off when piston 314 last triggered switch 230. PLC 301 ascertains whether HWSW is on or off by comparison of inputs at X1 and X2. If a signal was last received at terminal X1, HWSW is on; if a signal was last received at terminal X2, HWSW is off. To initiate flow of wax into heat exchangers 210 for the first time, an arbitrary starting value of HWSW=ON is generated. For this purpose, a signal is first generated to terminal X1 of PLC 301 to initially select the "on" position of HWSW (step 704) for each heat exchanger 210. HWSW=ON corresponds to valve couplet control 224, so that annular piston 314 in each heat exchanger will initially travel from left to right in FIGS. 1 and 2A, i.e., away from switch 228 and toward switch 230.

HWSW drives a software switch, SWSW, such as a flag in the memory of programmable computer 303. A decision step 706 is next executed so that the state of SWSW matches the state of HWSW. If HWSW is on (piston 314 last encountered proximity switch 228), software switch SWSW is set to the "on" position (step 708). If HWSW is off (piston 314 last encountered proximity switch 230), SWSW is set to the "off" position (step 710).

Depending on the state of SWSW, a decision is then made (step 712) to actuate one of valve couplet controls 224 or 226. If SWSW is off, control 226 is actuated (step 713) which opens inlet valve 206 and discharge valve 208. If SWSW is on, control valve 224 is actuated (step 714) which opens inlet valve 202 and discharge valve 204.

At this point, if heat exchangers 210 are being filled with wax for the first time and pump 504 is still in low pressure mode, it is preferred to delay turning on the system hydraulics to allow all pistons, valves, etc., to stabilize before pumping wax. The preferred duration of this delay is at least about 15 seconds. Pump 504 then switches to high pressure mode, valve 516 closes, and heat exchangers 210 fill with wax. Normally, however, pump 504 will already be in high-pressure mode, so that wax will enter inlet valve 202 or 206 as soon as it opens.

As wax enters heat exchanger 210, control system 300 continuously tests whether or not HSWS is equal to SWSW (step 720). The result will be yes until annular piston 314 reaches the extreme right end of heat exchanger 210 and trips the other proximity switch, in this example, proximity switch 230, at which point the mechanical toggle switch, HWSW, is turned off, while SWSW remains on. If a yes result is obtained for decision 720, the system returns to step 720 as shown.

When piston 314 reaches proximity switch 230, HWSW is turned off, so that HWSW no longer equals SWSW. A signal is then sent to terminal X2 of PLC 301 indicating that HWSW is off. At that time, if SWSW is still on (step 724), couplet control 224 is deactivated to close inlet valve 202 and discharge valve 204 (step 726). If SWSW is off, couplet control 226 is deactivated to close inlet valve 206 and discharge valve 208 (step 725). A predetermined dwell is then timed to allow the wax contained in heat exchanger 210 to reach the desired predetermined temperature (step 730). During dwell, annular piston 314 does not move because all of valves 202, 204, 206, 208 for that heat exchanger 210 are closed. Dwell duration is a program constant or a parameter entered by the programmer by means of computer 303. Dwell times are preferably staggered to reduce the chance that all heat exchangers 210 will enter dwell at the same time, placing a strain on the system. After the dwell is timed, the cycle is repeated by returning to step 706.

This cycle (steps 706-730) continues indefinitely until accumulator 210 becomes full, as indicated by the state of limit switches 222. As long as both of accumulator shot chamber pistons 232 are not fully retracted, pump 504 continues to cycle pistons 314 back and forth in each heat exchanger 210. If the cycle is interrupted because accumulator 212 becomes full, the cycle will resume at step 706 for each heat exchanger unless a dwell step 730 was in progress, in which case the dwell will be completed before returning to step 706. Since the state of HWSW and SWSW will remain unchanged, each annular piston 314 will continue to travel in the same direction as it travelled in prior to the interruption. If an annular piston 314 was moving from left to right, HWSW remains on; if annular piston 314 was travelling from right to left, HWSW remains off. An important feature of the present system is that HWSW drives SWSW to ensure that piston 314 resumes travel in the same direction the next time accumulator shot chamber piston 232 leaves ACC MSW 222 in response to a call for wax from wax injection press assembly 400.

FIG. 7B illustrates the program logic which controls the functioning of wax supply system 500. Wax supply system 500 is initially loaded and turned on, i.e. slabs are loaded into tank 524 and melted, providing a supply of liquid wax in reservoir 502 (step 752). Then pump 504 is turned on in low mode and back pressure valve 516 is opened to allow liquid wax to circulate through conduit system 600 (step 754). The selected heat exchanger valves 202 (or 206) are then opened to admit wax (step 756). A delay, preferably about 15 seconds, is then allowed for the system hydraulics to stabilize (step 758). Pump 504 is then set to high pressure mode and valve 516 is closed to begin feeding liquid wax into heat exchangers 210 (step 760).

Control system 300 then continuously monitors MSW 222 (step 762). If accumulator 212 is not full, the system then determines if all heat exchangers are in dwell, i.e. the last heat exchanger not already in dwell is about to enter dwell (step 764). These checks continue until accumulator 212 becomes full or all heat exchangers enter dwell. Steps are then taken to return pump 504 to low mode, open valve 516, and close all heat exchanger valves (steps 766, 768 or 770, 772). The system then waits until the condition which caused the shutdown no longer pertains (step 774 or 776) and then returns the pump and valves to their former condition (steps 778, 780). The system then returns to decision 762 and the cycle is repeated for as long as the system is active.

During the shuttling back and forth of pistons 314 in heat exchangers 210, press shot chamber 402 will become full and discharge valve 414 will close. This event has no direct impact on the operation of wax conditioning assembly 200. Wax will continue to be discharged from heat exchanger 210 into accumulator 212 and accumulator shot chamber 216, regardless of whether press shot chamber pistons 232 are fully retracted. When this occurs, pump 504 returns to the low pressure mode and wax conditioning assembly 200 will remain dormant until a call for wax causes pistons 232 to move forward and out of engagement with limit switches 222.

A wax distributing system 200 according to the invention successfully solves the tunnelling problem encountered when hot, liquid wax under pressure is used to urge semi-solid wax out of a heat exchanger. Annular piston 314 serves as a physical barrier between not-yet cooled wax and cooled wax within heat exchanger 210. This provides significant advantages over existing methods of lowering wax temperature prior to injecting a die. Inserting a piston between the high and the low temperature wax allows the high temperature wax to push against the high-temperature face of the piston, whereby the low temperature face of the piston pushes the lower temperature wax through the heat exchanger. There exists the possibility of small-scale tunneling (leakage) about the periphery of the piston, however, but this small amount of bypass wax is quickly cooled as it contacts the heat exchange medium interface.

The water which passes through heat exchanger 210 returns to tank 802 and is maintained at a temperature sufficient to reduce the temperature of the wax to the desired injection temperature. Using the thermodynamic properties of the heat exchange medium, the particular wax involved, and the volume of water and wax contained in the heat exchanger, the preferred heat exchanger dwell time is computed. For example, volumes and velocities can be selected so that dwell time is approximately three and a half minutes. Use of an annular heat exchanger helps reduce dwell time and ensure a uniform temperature within the volume of wax. The greater the volume flow rate of water in the heat exchanger, the lower the resulting residence (dwell) time of the wax in the heat exchanger, and in some situations, dwell might be omitted. Other factors, such as water pump, wax pump, and heat exchanger capacities, will impact on the dwell time determination.

As previously discussed, it is desirable to inject wax into a die at the lowest possible temperature while still ensuring that the wax completely fills all voids in the die to minimize the amount of shrinkage which occurs as the wax cools. Moreover, a lower injection temperature reduces the time required to cool the wax patterns. Thus, precisely controlling the injection temperature of the wax decreases total cycle time per part and improves dimensional integrity.

Another important advantage of the present invention is that handling time is minimized. Total time between cycles is reduced because the wax is continuously available for injection into a die. This eliminates the need to open the wax injection press to add wax manually, as in the prior art.

The utility of the present system is not limited to the lost wax industry. The system can be employed to distribute any substance, the viscosity of which is temperature sensitive. This includes, but is not limited to, petroleum derivatives, chemicals, soap, chocolate, foodstuffs, or plastics. Thus, although the foregoing description is limited to wax, the process and apparatus of the invention are useful with any substance capable of assuming a fluid state.

It will be understood that while the system 100 as described includes only two heat exchangers, one accumulator, and one injection press assembly, the system may comprise a plurality of accumulators, and injection machines. For example, more than two heat exchangers can be mounted on a single accumulator by suitable modification of the manifolds to include additional passages, or by providing multiple reservoirs and manifolds between a pair of wax presses disposed at either end of the accumulator. As another example, each reservoir can communicate with more than one wax injection press, for example, by a series of conduits 416 connected to a single reservoir 211. To accomodate additional presses, the PLC is modified to accept multiple calls for wax, and the software is similarly modified so that the accumulator responds to a call for wax from any or all of the wax injection presses. A relay may be set up which is tripped by an injection request from any one of the presses. In practice, it has proven advantageous to connect several wax injection presses to a single accumulator.

Further, the above description is of a preferred exemplary embodiment of the present invention, and the invention is not limited to the specific forms shown. For example, while the system was described using an injection press assembly employing a particular series of steps in performing an injection cycle, the instant invention will accommodate various injection presses from various manufacturers having different sequences because the system operates substantially independently from the injection press. These and other modifications may be made without departing from the scope of the invention as expressed in the appended claims.

I claim:

1. A system for distributing a semi-solid substance to a work station, comprising:
   a heat exchanger for reducing the temperature of a liquid substance so that said substance assumes a semi-solid form;
   means for supplying said liquid substance to said heat exchanger;
   an accumulator disposed to receive said semi-solid substance from said heat exchanger and store said semi-solid substance therein;
   means for urging said semi-solid substance from said heat exchanger into said accumulator; and
   means for feeding said semi-solid substance from said accumulator to the work station;
   wherein said heat exchanger comprises a pair of concentric tubes defining an annular heat exchange chamber therebetween, a first pair of inlet and outlet valves which communicate with said chamber at opposite ends thereof, and a second pair of inlet and outlet valves which communicate with said chamber at opposite ends thereof, and said urging means comprises an annular piston disposed to reciprocate in said chamber which alternately urges said semi-solid substance therein out of one of said outlet valves and into said accumulator.

2. The system of claim 1, wherein said urging means further comprises a pump which feeds said liquid substance into said chamber of said heat exchanger to propel said annular piston against said semi-solid substance.

3. The system of claim 2, wherein said supplying means comprises a reservoir for holding said liquid substance and means for stirring said liquid substance in said reservoir.

4. An apparatus for distributing a semi-solid substance to a work station, comprising:
   a heat exchanger for changing the temperature of a liquid substance so that the substance assumes a semi-solid form, wherein said heat exchanger has associated inlet and outlet conduits provided with respective inlet and outlet valves;
   means for supplying the liquid substance to the heat exchanger, including a pump disposed to feed the liquid substance to said heat exchanger;
   a piston for ejecting said semi-solid substance from said heat exchanger with each stroke of said piston, said piston disposed for movement within said heat exchanger between the liquid substance entering said heat exchanger through the heat exchanger inlet and the semi-solid substance leaving said heat exchanger through the heat exchanger outlet to substantially prevent the liquid substance from tunneling through the semi-solid substance and leaving the heat exchanger through the heat exchanger outlet; and
   means for feeding said semi-solid substance from said heat exchanger to the work station, including an accumulator having an inlet connected to receive the semi-solid substance from said heat exchanger outlet conduit, means for defining a variable volume chamber in which the semi-solid substance is stored in a condition substantially free of voids, and an outlet through which the semi-solid substance is fed out of said accumulator to the work station.

5. The apparatus of claim 4, wherein:
   said heat exchanger includes a pair of parallel, inner and outer pipes defining a heat exchange chamber therebetween, a first pair of said inlet and outlet valves which communicate with said heat exchanger chamber at opposite ends thereof, and a second pair of said inlet and outlet valves which communicate with said heat exchange chamber at opposite ends thereof.

6. The apparatus of claim 4, further including: first temperature control means for maintaining the substance in liquid form in said liquid substance supplying means; and
   second temperature control means for maintaining the substance in semi-solid form in said heat exchanger and said accumulator.

7. The apparatus of claim 6, wherein said first temperature control means includes a reservoir connected to said supplying means and containing the liquid substance, and a heater for heating the liquid substance and maintaining the liquid substance in a liquid state within said reservoir, and said second temperature control means includes means for circulating a heat exchange medium about said heat exchanger and said accumulator.

8. The apparatus of claim 4, wherein said feeding means further includes a piston disposed in said accumulator for urging the semi-solid substance through said accumulator outlet, a conduit connected to the accumulator outlet for conducting a stream of the semi-solid substance from the accumulator to the work station, and an accumulator outlet valve in communication with said conduit.

9. The apparatus of claim 8, further including: a control system for opening the heat exchanger inlet and outlet valves to simultaneously allow said liquid substance to enter said heat exchanger and allow said semi-solid substance in said heat exchanger to enter said accumulator;
   a sensor for detecting when said accumulator becomes full of the semi-solid substance; and
   a control system for closing said heat exchanger inlet and outlet valves for so long as (A) the accumulator sensor detects that the accumulator is full of the semi-solid substance, or (B) said accumulator piston is in operation for urging the semi-solid substance from said accumulator.

10. The apparatus of claim 9, further comprising:
    a sensor for determining when said heat exchanger piston reaches a predetermined position upon filling of said heat exchanger with the liquid substance; and
    a control system connected to said heat exchanger sensor for closing said heat exchanger inlet and outlet valves and keeping said heat exchanger inlet and outlet valves closed for a predetermined dwell time after said heat exchanger sensor determines that the heat exchanger piston has reached the predetermined position.

11. An apparatus for distributing a semi-solid substance to a work station, comprising:
a heat exchanger for changing the temperature of a liquid substance so that the substance assumes a semi-solid form;
means for supplying the liquid substance to said heat exchanger;
means for urging said semi-solid substance from said heat exchanger, said urging means including means disposed within said heat exchanger for substantially preventing the liquid substance from tunneling through the semi-solid substance and leaving said heat exchanger; and
means for feeding said semi-solid substance from said heat exchanger to the work station;
wherein said heat exchanger comprises three nested, elongated inner, middle, and outer pipes, inlet means for conducting said liquid substance into the interior of said middle pipe about the outer surface of said inner pipe, and outlet means for conducting said semi-solid substance out of said heat exchanger, and further comprising temperature control means for circulating a heat exchange medium through the interior of said inner pipe and through the interior of said outer pipe about the outer surface of said middle pipe; and
wherein said urging means comprises a piston mounted between said inner pipe and said middle pipe having means for slideably, sealingly engaging said inner and middle pipes; and
wherein said inner, middle, and outer pipes are concentrically disposed, said piston comprises a cylindrical metal barrel, and said engaging means comprises plastic annular radial flanges at opposite ends of said barrel.

12. An apparatus for distributing a semi-solid substance to a work station, comprising:
a heat exchanger for reducing the temperature of a liquid substance so that said substance assumes a semi-solid form;
means for supplying said liquid substance to said heat exchanger, including a pump, a first conduit for conducting said liquid substance from said pump into said heat exchanger, a first valve disposed in said first conduit for regulating communication between said pump and said heat exchanger, and a reservoir containing said liquid substance and means for heating said liquid substance, said pump being disposed to draw said liquid substance from said reservoir, wherein said first conduit further comprises a return line for recirculating said liquid substance to said reservoir when said first valve is closed;
means for urging said semi-solid substance from said heat exchanger, including a heat exchanger piston disposed for movement within said heat exchanger; and
means for conducting said semi-solid substance from said heat exchanger to the work station, including a second conduit, a second valve disposed in said second conduit, an accumulator for storing a supply of said semi-solid substance, said accumulator having an inlet and an outlet, said inlet being connected to said heat exchanger by said second conduit with said second valve being disposed to regulate communication between said heat exchanger and said accumulator, and means for urging said semi-solid wax in a continuous stream through said accumulator outlet to the work station, including an accumulator piston disposed within said accumulator and means for advancing said accumulator piston, which accumulator piston cooperates with internal walls of said accumulator to define a storage chamber of variable volume therein;
control means for opening said valves to simultaneously feed said liquid substance into said heat exchanger and feed said semi-solid substance in said heat exchanger into said accumulator;
sensor means for detecting when said accumulator becomes full of said substance; and
control means for closing said valves for so long as said detecting means detects that said accumulator is full of said substance, the work station being a wax injection press.

13. The apparatus of claim 12, further comprising a third conduit connected to said accumulator outlet for conducting said stream of said semi-solid substance from said accumulator to the work station, and a third valve disposed in said third conduit for regulating communication between said accumulator and the work station.

14. The apparatus of claim 12, further comprising:
first temperature control means for maintaining said substance in liquid form in said liquid substance supplying means; and
second temperature control means for maintaining said substance in semi-solid form in said heat exchanger, said second conduit, and said accumulator.

15. The apparatus of claim 14, wherein said second temperature control means comprises means for circulating a heat exchange medium about said heat exchanger and said accumulator.

16. An apparatus for distributing a semi-solid substance to a work station, comprising:
a heat exchanger for reducing the temperature of a liquid substance so that said substance assumes a semi-solid form;
means for supplying said liquid substance to said heat exchanger, including a pump, a first conduit for conducting said liquid substance from said pump into said heat exchanger, and a first valve disposed in said first conduit for regulating communication between said pump and said heat exchanger;
means for urging said semi-solid substance from said heat exchanger, including a heat exchanger piston disposed for movement within said heat exchanger;
means for conducting said semi-solid substance from said heat exchanger to the work station, including a second conduit, a second valve disposed in said second conduit, an accumulator for storing a supply of said semi-solid substance, said accumulator having an inlet and an outlet, said inlet being connected to said heat exchanger by said second conduit, said second valve being disposed to regulate communication between said heat exchanger and said accumulator, and means for urging said semi-solid wax in a continuous stream through said accumulator outlet to the work station, including an accumulator piston disposed within said accumulator and means for advancing said accumulator piston, which accumulator piston cooperates with internal walls of said accumulator to define a storage chamber of variable volume therein;

first control means for opening said first and second valves to simultaneously feed said liquid substance into said heat exchanger and feed said semi-solid substance in said heat exchanger into said accumulator;

first sensor means for detecting when said accumulator becomes full of said substance;

second control means for closing said first and second valves for so long as said first sensor means detects that said accumulator is full of said substance;

second sensor means for detecting when said heat exchanger piston reaches a predetermined position upon filling of said heat exchanger with said liquid substance; and third control means connected to said second sensor means for closing said first and second valves and keeping said valves closed for a predetermined dwell time after said second sensor means determines that said heat exchanger piston has reached said predetermined position.

17. An apparatus for distributing a substance to a work station, comprising:

a heat exchanger for changing the temperature of the substance, said heat exchanger having a first inlet and a first outlet at one end thereof and a second inlet and second outlet at the other end thereof, and respective first and second inlet and outlet valves for opening and closing said first and second inlets and outlets, respectively;

means for supplying the substance to said heat exchanger through said first and second inlets; and means for feeding the substance from said heat exchanger to the work station, including a piston disposed for reciprocal, lengthwise sliding movement within said heat exchanger between said first inlet and said second inlet, and between said first outlet and said second outlet, which piston urges the substance through said second outlet when said supplying means supplies the substance to said heat exchanger through said first inlet, with said valves associated with said first inlet and second outlet open and said valves associated with said second inlet and said first outlet closed, and which piston urges the substance through said first outlet when said supplying means supplies the substance to said heat exchanger through said second inlet, with said valves associated with said second inlet and first outlet open and said valves associated with said first inlet and said second outlet closed.

18. An apparatus for distributing a substance to a work station, comprising:

a heat exchanger for changing the temperature of the substance, said heat exchanger having a first inlet and a first outlet at one end thereof and a second inlet and second outlet at the other end thereof, and respective first and second inlet and outlet valves for opening and closing said first and second inlets and outlets, respectively;

means for supplying the substance to said heat exchanger through said first and second inlets; and means for feeding the substance from said heat exchanger to the work station, including a piston disposed to reciprocal, lengthwise sliding movement within said heat exchanger between said first inlet and said second inlet, and between said first outlet and said second outlet, which piston urges the substance through said second outlet when said supplying means supplies the substance to said heat exchanger through said first inlet, with said valves associated with said first inlet and second outlet open and said valves associated with said second inlet and said first outlet closed, and which piston urges the substance through said first outlet when said supplying means supplies the substance to said heat exchanger lthrough said second inlet, with said valves associated with said second inlet and first outlet open and said valves associated with said first inlet and said second outlet closed;

wherein said supplying means comprises a pump having a high and low output mode, and said apparatus further comprises control means for selecting said high output mode when one of said first and said second inlet valves is open and for selecting said low output mode when said first and said second inlet valves are closed.

19. An apparatus for distributing a substance to a work station, comprising:

a heat exchanger for changing the temperature of the substance, said heat exchanger having a first inlet and a first outlet at one end thereof and a second inlet and second outlet at the other end thereof, and respective first and second inlet and outlet valves for opening and closing said first and second inlets and outlets, respectively;

means for supplying the substance to said heat exchanger through said first and second inlets; and means for feeding the substance from said heat exchanger to the work station, including a piston disposed to reciprocal, lengthwise sliding movement within said heat exchanger between said first inlet and said second inlet, and between said first outlet and said second outlet, which piston urges the substance through said second outlet when said supplying means supplies the substance to said heat exchanger through said first inlet, with said valves associated with said first inlet and second outlet open and said valves associated with said second inlet and said first outlet closed, and which piston urges the substance through said first outlet when said supplying means supplies the substance to said heat exchanger through said second inlet, with said valves associated with said second inlet and first outlet open and said valves associated with said first inlet and said second outlet closed;

wherein said heat exchanger further comprises:

an elongated conduit having a first proximity sensor disposed near said first inlet and first outlet and a second proximity sensor disposed near said second inlet and second outlet;

control means for closing said first inlet valve when said piston triggers said second sensor and for closing said second inlet valve when said piston triggers said first sensor; and said piston comprises a cylindrical metal barrel detectable by said proximity sensors, said barrel having a pair of plastic annular radial flanges mounted at opposite ends thereof, which flanges slidingly engage an interior surface of said heat exchanger.

20. An apparatus for distributing a semi-solid substance to a work station, comprising:

a reservoir for storing a supply of a liquid substance;

a circulation conduit connected at opposite ends thereof to said reservoir;

a pump disposed to circulate said liquid substance through said conduit;

a heater disposed to heat said substance and maintain said substance in liquid form in said reservoir;

a heat exchanger for changing the temperature of the liquid substance so that the substance assumes a semi-solid form;

a branch conduit connected to conduct said liquid substance from said circulation conduit to said heat exchanger;

a back pressure valve disposed in said recirculation conduit downstream of said branch conduit;

a heat exchanger inlet valve disposed in said branch conduit;

means for urging the semi-solid substance from said heat exchanger; and means for feeding the semi-solid substance from said heat exchanger to the work station.

21. The apparatus of claim 20, further comprising thermal insulation surrounding said circulation conduit.

22. The apparatus of claim 20, further comprising control means for opening said inlet valve and closing said back pressure valve to feed said liquid substance into said heat exchanger, and for closing said inlet valve and opening said back pressure valve to circulate said liquid substance through said circulation conduit and back to said reservoir.

23. The apparatus of claim 22, wherein said pump has high and low pressure modes, and said control means further includes means for selecting said high pressure mode when said inlet valve is open and said back pressure valve is closed, and for selecting said low pressure mode when said inlet valve is closed and said back pressure valve is open.

24. The apparatus of claim 22, further comprising means in said reservoir for agitating said liquid substance.

25. An apparatus for distributing a semi-solid substance to a work station, comprising:

a supply system, including a reservoir for storing a supply of a liquid substance capable of assuming a semi-solid form upon a change in temperature, a circulation conduit connected at opposite ends thereof to said reservoir, a pump disposed to circulate said liquid substance through said conduit, and a heater disposed to heat said substance and maintain said substance in liquid form in said reservoir;

a heat exchanger for changing the temperature of the liquid substance so that the substance assumes a semi-solid form, including a pair of nested pipes defining a heat exchange chamber therebetween, a first pair of inlet and outlet valves which communicate with said heat exchange chamber at opposite ends thereof, a second pair of inlet and outlet valves which communicate with said heat exchange chamber at opposite ends thereof, and a piston disposed to reciprocate in said heat exchange chamber, which piston alternately urges the semi-solid substance therein out of one of said outlet valves in response to pressure exerted on said piston by said liquid substance entering said heat exchange chamber through the inlet valve remote from the outlet valve towards which said piston is travelling;

a pair of branch conduits connected to conduct said liquid substance from said circulation conduit to said first and second inlets of said heat exchanger, respectively;

an accumulator including a housing having an internal chamber in which the semi-solid substance is stored, inlet means for receiving the semi-solid substance from said heat exchanger outlets and conducting the semi-solid substance into said shot chamber, an outlet through which the semi-solid substance exits said accumulator, and a shot piston including a head disposed in said shot chamber, a piston rod connected to said head and extending through said housing, and means connected to said piston rod for extending said piston rod to press said semi-solid substance out through said accumulator outlet;

first temperature control means for maintaining the substance in liquid form in said supply system; and second temperature control means for maintaining the substance in semi-solid form in said heat exchanger and said accumulator;

an outlet conduit connected to said accumulator outlet for conducting said stream of said semi-solid substance from said accumulator to the work station; and a work station valve connected to said outlet conduit for regulating communication between said accumulator and the work station.

26. The apparatus of claim 25, further including: control means for sequentially:

(1) opening said first heat exchanger inlet valve and said second heat exchanger outlet valve and closing said second heat exchanger inlet valve and said first heat exchanger outlet valve to fill said heat exchanger with said liquid substance and cause said piston to press said semi-solid substance out through said second outlet valve;

(2) closing said first inlet valve and said second outlet valve to stop movement of said piston for a dwell period sufficient to cause said liquid substance which has entered said heat exchanger to become solid;

(3) closing said first heat exchanger inlet valve and said second heat exchanger outlet valve and opening said second heat exchanger inlet valve and said first heat exchanger outlet valve to again fill said heat exchanger with said liquid substance and cause said piston to press said semi-solid substance out through said first outlet valve;

(4) closing said second inlet valve and said first outlet valve to stop movement of said piston for a dwell period sufficient to cause said liquid substance which has entered said heat exchanger to become solid; and (5) repeating operations (1) to (4);

a sensor for detecting when said accumulator becomes full of said semi-solid substance;

control means for closing said first and second heat exchanger inlet and outlet valves and suspending operations (1) to (5) for so long as the accumulator sensor detects that the accumulator is full of the semi-solid substance, or the accumulator piston is in operation for urging the semi-solid substance from the accumulator.

27. An apparatus for distributing a semi-solid substance to a work station, comprising:

a plurality of heat exchangers for changing the temperature of a liquid substance so that it assumes a semi-solid form;

means for feeding the liquid substance to said heat exchangers;

an accumulator for storing said semi-solid substance, including:

a reservoir for storing the semi-solid substance, said reservoir having an outlet through which the semi-solid substance exits said accumulator, a press unit for urging said semi solid substance out of said accumulator, including a housing defining a shot chamber therein and a piston assembly including a movable piston disposed in said shot chamber, an inlet manifold interposed between said press unit and said reservoir, said manifold having inlet means for receiving the semi-solid substance from each of said heat exchangers, and passage means for allowing the semi-solid substance to enter said reservoir and said shot chamber from said inlet means, and means for maintaining the semi-solid substance in said accumulator at a temperature at which said substance remains in a semi-solid state; and means for conducting said semi-solid substance from said accumlator outlet to the work station.

28. The apparatus of claim 27, wherein said said shot piston further comprises a head disposed in said shot chamber, a piston rod connected to said head and extending through said housing, and means connected to said piston rod for extending said piston rod to press said semi-solid substance out through said accumulator outlet.

29. The apparatus of claim 27, further comprising valve means for isolating said manifold from said heat exchangers during operation of said press unit.

* * * * *